(12) United States Patent
Uzawa et al.

(10) Patent No.: US 10,049,780 B2
(45) Date of Patent: Aug. 14, 2018

(54) ELECTROCONDUCTIVE COMPOSITION, ELECTRICAL CONDUCTOR, LAMINATE AND METHOD FOR PRODUCING SAME, ELECTROCONDUCTIVE FILM, AND SOLID ELECTROLYTE CONDENSER

(71) Applicant: Mitsubishi Chemical Corporation, Tokyo (JP)

(72) Inventors: Masashi Uzawa, Toyohashi (JP); Akira Yamazaki, Toyohashi (JP); Hiroya Fukuda, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 231 days.

(21) Appl. No.: 14/890,763

(22) PCT Filed: May 16, 2014

(86) PCT No.: PCT/JP2014/063069
§ 371 (c)(1),
(2) Date: Nov. 12, 2015

(87) PCT Pub. No.: WO2014/185522
PCT Pub. Date: Nov. 20, 2014

(65) Prior Publication Data
US 2016/0093413 A1      Mar. 31, 2016

(30) Foreign Application Priority Data

May 16, 2013 (JP) .................................. 2013-103649
Jun. 11, 2013 (JP) .................................. 2013-122623
(Continued)

(51) Int. Cl.
*H01G 9/00* (2006.01)
*H01G 9/02* (2006.01)
(Continued)

(52) U.S. Cl.
CPC ............ *H01B 1/128* (2013.01); *B32B 27/06* (2013.01); *B32B 27/20* (2013.01);
(Continued)

(58) Field of Classification Search
CPC .......... H01B 1/128; H01G 9/15; H01G 9/028; H01G 9/048
(Continued)

(56) References Cited

U.S. PATENT DOCUMENTS 6,024,895 A      2/2000   Shimizu et al.
2003/0208014 A1  11/2003  Kerres et al.
(Continued)

FOREIGN PATENT DOCUMENTS

CN      1433442 A    7/2003
EP      0 844 284 A1 5/1998
(Continued)

OTHER PUBLICATIONS

International Search Report dated Aug. 26, 2014 in PCT/JP2014/063069 (with English language translation).
(Continued)

*Primary Examiner* — Eric Thomas
*Assistant Examiner* — Arun Ramaswamy
(74) *Attorney, Agent, or Firm* — Oblon, McClelland, Maier & Neustadt, L.L.P.

(57) ABSTRACT

The electroconductive composition of the present invention contains an electroconductive polymer (A) having a sulfonic acid group and/or carboxylic acid group, and a basic compound (B) having two or more nitrogen atoms. The electrical conductor of the present invention consists of the electroconductive composition. In the laminate of the present invention, the electrical conductor is laminated on at least one surface of a substrate. The method for producing a laminate of the present invention includes applying the
(Continued)

electroconductive composition to at least one surface of a substrate, heating and drying the composition, and forming an electrical conductor. The electroconductive film of the present invention is provided with the electrical conductor. The solid electrolyte condenser of the present invention is provided with a positive electrode consisting of a porous body of a valve metal, a dielectric layer formed by oxidizing the positive electrode surface, and one or more solid electrolyte layers formed on the dielectric layer surface side, and at least one of the solid electrolyte layers is formed of the electroconductive composition.

20 Claims, 2 Drawing Sheets

(30) Foreign Application Priority Data

Aug. 29, 2013 (JP) ................................ 2013-177945
Oct. 28, 2013 (JP) ................................ 2013-223630
Apr. 28, 2014 (JP) ................................ 2014-092260

(51) Int. Cl.
| | |
|---|---|
| B01J 13/00 | (2006.01) |
| H01M 6/14 | (2006.01) |
| H01G 9/04 | (2006.01) |
| H01G 9/145 | (2006.01) |
| H01B 1/12 | (2006.01) |
| C08K 5/17 | (2006.01) |
| C08L 101/12 | (2006.01) |
| C08L 101/14 | (2006.01) |
| H01G 9/028 | (2006.01) |
| C09D 179/02 | (2006.01) |
| C08K 5/34 | (2006.01) |
| C08K 5/3432 | (2006.01) |
| C08K 5/3462 | (2006.01) |
| C08G 73/02 | (2006.01) |
| B32B 27/06 | (2006.01) |
| B32B 27/20 | (2006.01) |
| H01G 9/15 | (2006.01) |
| H01G 9/048 | (2006.01) |

(52) U.S. Cl.
CPC ............ *C08G 73/0266* (2013.01); *C08K 5/17* (2013.01); *C08K 5/34* (2013.01); *C08K 5/3432* (2013.01); *C08K 5/3462* (2013.01); *C08L 101/12* (2013.01); *C08L 101/14* (2013.01); *C09D 179/02* (2013.01); *H01G 9/0036* (2013.01); *H01G 9/028* (2013.01); *H01G 9/048* (2013.01); *H01G 9/15* (2013.01); *B32B 2307/202* (2013.01); *B32B 2307/7265* (2013.01); *B32B 2457/00* (2013.01)

(58) Field of Classification Search
USPC .................................. 361/523, 525, 526, 528
See application file for complete search history.

(56) References Cited

U.S. PATENT DOCUMENTS

| | | | |
|---|---|---|---|
| 2009/0080143 A1* | 3/2009 | Kobayashi | ............... H01G 9/07 361/523 |
| 2010/0009296 A1 | 1/2010 | Kon | |
| 2014/0043731 A1 | 2/2014 | Yamada et al. | |

FOREIGN PATENT DOCUMENTS

| | | | | |
|---|---|---|---|---|
| EP | 0844284 A1 * | 5/1998 | ............. | C08G 61/02 |
| EP | 2 138 897 A1 | 12/2009 | | |
| JP | 7-196791 A | 8/1995 | | |
| JP | 7-324132 A | 12/1995 | | |
| JP | 9-22833 A | 1/1997 | | |
| JP | 10-158395 A | 6/1998 | | |
| JP | 2000-79662 A | 3/2000 | | |
| JP | 2001-98069 A | 4/2001 | | |
| JP | 2003-213148 A | 7/2003 | | |
| JP | 2007-264118 A | 10/2007 | | |
| JP | 2010-67448 A | 3/2010 | | |
| JP | 2010-116441 A | 5/2010 | | |
| JP | 2011-126957 A | 6/2011 | | |
| JP | 2011-131409 A | 7/2011 | | |
| TW | 201302854 A1 | 1/2013 | | |
| WO | WO97/07167 A1 | 2/1997 | | |
| WO | WO 2008/114411 A1 | 9/2008 | | |
| WO | WO 2012/144608 A1 | 10/2012 | | |

OTHER PUBLICATIONS

Dennis E. Tallman, et al., "Preparation and preliminary characterization of a poly(4-vinylpyridine) complex of a water-soluble polyaniline" Synthetic Metals, vol. 90, No. 1, 1997, pp. 13-18.

Isao Yamaguchi, et al., "Synthesis of 4,4'-bipyridinium salts of poly(2-methoxyaniline-5-sulfonic acid) and their self-doping and chemical properties" Reactive and Functional Polymers, vol. 69, No. 2, 2009, pp. 91-96.

Combined Office Action and Search Report dated Jun. 10, 2015 in Taiwanese Patent Application No. 103117350 (with English language translation).

* cited by examiner

ELECTROCONDUCTIVE COMPOSITION, ELECTRICAL CONDUCTOR, LAMINATE AND METHOD FOR PRODUCING SAME, ELECTROCONDUCTIVE FILM, AND SOLID ELECTROLYTE CONDENSER

TECHNICAL FIELD

The present invention relates to an electroconductive composition, an electrical conductor, a laminate, a method for manufacturing it, an electroconductive film, and a solid electrolyte condenser.

The present invention claims priority from Japanese Patent Application No. 2013-103649 filed on May 16, 2013, Japanese Patent Application No. 2013-122623 filed on Jun. 11, 2013, Japanese Patent Application No. 2013-177945 filed on Aug. 29, 2013, Japanese Patent Application No. 2013-223630 filed on Oct. 28, 2013, and Japanese Patent Application No. 2014-92260 filed on Apr. 28, 2014, and the disclosures of which are incorporated herein by reference.

BACKGROUND ART

An electroconductive polymer having an acidic group like a sulfonic acid group and/or a carboxylic acid group (carboxy group) exhibit excellent solubility in water or an organic solvent due to the hydrophilic property of the acidic group, and thus studies are made on various synthetic methods.

Furthermore, an electrical conductor (electroconductive polymer film) having the electroconductive polymer with an acidic group as a main component, a laminate provided with the electrical conductor, and a method for manufacturing them are reported (see, Patent Document 1, for example).

However, while the electroconductive polymer having an acidic group has excellent solubility in a water soluble solvent, the electrical conductor formed of an electroconductive composition containing the polymer has insufficient water resistance. For such reasons, the electrical conductor has limitation in terms of use, that is, it is not suitable for a use in which water resistance is required.

Furthermore, for forming an electrical conductor, an electroconductive composition is generally applied on a substrate, several times by an impregnation method or the like, and plural coating films are overlaid to form an electrical conductor with desired thickness. In this regard, since the electrical conductor has insufficient water resistance, an already-formed coating film is dissolved in an electroconductive composition which is applied onto it. Thus, there is a case in which it is difficult to achieve overlapping application.

In order to solve the aforementioned problems, a method including forming a coating film on a substrate by applying an electroconductive composition containing an electroconductive polymer with an acidic group and heating the electrical conductor at 150 to 280° C. is suggested (see, Patent Document 2, for example).

According to this method, as the electrical conductor is heated at pre-determined temperature, the acidic group is appropriately dissociated, and as a result, water resistance of the electrical conductor is improved.

However, when a coating film is heated as it is described in Patent Document 2, the acidic group is intentionally dissociated to improve the water resistance of an electrical conductor so that the electroconducting property is easily lowered.

A method of adding a specific basic compound to suppress the dissociation of an acidic group is also suggested (see, Patent Document 3, for example).

According to this method, a lowered electroconducting property can be suppressed but, as the dissociation of the acidic group is suppressed, it was unable to have the water resistance.

Meanwhile, a solid electrolyte condenser having a solid electrolyte layer, which is formed, on top of a dielectric layer (dielectric oxide film) formed on a surface of a positive electrode (coating film forming metal) consisting of a porous body of a metal with valve action (valve metal) like aluminum, niobium, tantalum, titan, and magnesium, by using an electroconductive polymer as a solid electrolyte, and a negative electrode in order has been developed.

This solid electrolyte condenser has conductivity of a solid electrolyte which is 10 to 100 times higher than that of a solid electrolyte condenser of the related art in which manganese dioxide is used as a solid electrolyte, and as ESR (equivalent series resistance) can be greatly reduced, it is expected to be used for various applications including absorbing high frequency noise of a small electronic device.

According to a recent tendency of having high frequency and large current for an integrated circuit, a solid electrolyte condenser having low ESR, high capacitance, and high reliability is required.

As a monomer for constituting an electroconductive polymer, pyrrole, thiophene, 3,4-ethylene dioxythiophene, aniline, and the like are known.

Furthermore, as a method for forming a solid electrolyte layer on a dielectric layer, a chemical oxidative polymerization or an electrolytic polymerization is generally used.

However, as a polymerization reaction occurs on a dielectric layer, the chemical oxidative polymerization and an electrolytic polymerization easily allow an incorporation of impurities in a solid electrolyte layer, providing a cause for having short circuit.

In addition, it is easy to have a complicated manufacturing process.

As a measure for solving this problem, a method of forming a solid electrolyte layer without performing a chemical oxidative polymerization or an electrolytic polymerization on a dielectric layer, specifically, a polymer suspension coating method is known.

The polymer suspension coating method is a method for forming a solid electrolyte layer in which a monomer is polymerized in advance to give an electroconductive polymer and a dispersion containing the electroconductive polymer is coated and dried on a dielectric layer to form a coating film.

However, in case of the polymer suspension coating method, it is difficult for a dispersion of an electroconductive polymer to impregnate in the inside of a dielectric layer. As a result, a solid electrolyte layer is not easily formed in the inside of the fine irregularities (pores) of a dielectric layer and it is formed only on a surface layer. Thus, there is a problem that the electric capacitance exhibition rate of the obtained solid electrolyte condenser is low.

In this regard, a method of forming a solid electrolyte layer by impregnating a dielectric layer in an electroconductive polymer, which is soluble in water or an organic solvent, is suggested (see, Patent Documents 4 and 5, for example).

According to this method, it is possible to impregnate an electroconductive polymer even in the inside of a dielectric layer so that a solid electrolyte can be also formed in the inside of the fine irregularities (pores) of a dielectric layer.

In particular, by adding a basic compound to a solution of an electroconductive polymer, deterioration caused by heat which is generated during manufacturing of a condenser can be prevented, and thus the electric capacitance exhibition rate of a solid electrolyte condenser can be further increased.

In recent years, however, a positive electrode consisting of a porous body of a valve metal is micronized in accordance with a tendency of having a solid electrolyte condenser with small size•light weight•large capacitance, and therefore it has fine pores with various shapes.

Thus, the inside of a dielectric layer formed on a surface of such positive electrode also becomes micronized and complicated. Accordingly, sufficient impregnation of fine pores with an electroconductive polymer is also required.

Furthermore, in case of a solid electrolyte condenser obtained by the method described in Patent Documents 4 and 5, there can be a case of having lowered electric capacitance when a durability test like heating at a temperature higher than the temperature applied during condenser manufacturing process is performed.

CITATION LIST

Patent Document

Patent Document 1: JP 7-196791 A
Patent Document 2: JP 2001-98069 A
Patent Document 3: JP 2010-116441 A
Patent Document 4: JP 9-22833 A
Patent Document 5: WO 2012/144608 A

DISCLOSURE OF THE INVENTION

Problem to be Solved by the Invention

First object of the present invention is to provide an electroconductive composition allowing forming of an electrical conductor with high electroconducting property and excellent water resistance, an electrical conductor, a laminate provided with the electrical conductor, a method for manufacturing it, and an electroconductive film.

Second object of the present invention is to provide a solid electrolyte condenser with high durability in which the electroconductive polymer layer is sufficiently impregnated even in the inside of the positive electrode having a dielectric layer.

Means for Solving Problem

As a result of intensive studies carried out by the inventors of the present invention, it was found that, by using an electroconductive composition containing an electroconductive polymer with an acidic group and a basic compound with two or more nitrogen atoms, an electrical conductor with excellent water resistance can be obtained without compromising the electroconducting property. It was also found that, by using this electroconductive composition, the impregnation property to the inside of fine pores of a dielectric layer is improved and also the durability of a solid electrolyte layer against heat is improved, and the present invention is completed accordingly.

Namely, the present invention encompasses the following aspects.

<1> An electroconductive composition containing an electroconductive polymer (A) with a sulfonic acid group and/or a carboxylic acid group and a basic compound (B) having two or more nitrogen atoms.

<2> The electroconductive composition described in <1>, in which the basic compound (B) has two or more nitrogen-containing heterocycles.

<3> The electroconductive composition described in <1> or <2>, further containing a basic compound (C) having one nitrogen atom.

<4> The electroconductive composition described in <3>, in which the boiling point of the basic compound (C) is lower than the boiling point of the basic compound (B).

<5> The electroconductive composition described in <3> or <4>, in which the base dissociation constant (pKb) of the basic compound (C) at 25° C. is lower than the base dissociation constant (pKb) of the basic compound (B) at 25° C.

<6> The electroconductive composition described in any one of <1> to <5>, further containing a water soluble or water dispersible polymer (D) (with the proviso that the electroconductive polymer (A) is excluded).

<7> The electroconductive composition described in any one of <1> to <6>, in which the base dissociation constant (pKb) of the basic compound (B) at 25° C. is 4.5 or more.

<8> The electroconductive composition described in any one of <1> to <7>, in which the basic compound (B) has a conjugated structure.

<9> The electroconductive composition described in any one of <1> to <8>, in which the electroconductive polymer (A) has a unit represented by the following general formula (1):

[Chem. 1]

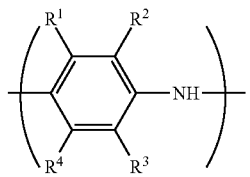

(1)

In the formula (1), each of $R^1$ to $R^4$ is independently selected from a group consisting of a hydrogen atom, a linear or branched alkyl group with 1 to 24 carbon atoms, a linear or branched alkoxy group with 1 to 24 carbon atoms, an acidic group, a hydroxy group, a nitro group, and a halogen atom, and at least one of $R^1$ to $R^4$ is an acidic group. As described herein, the acidic group indicates a sulfonic acid group or a carboxylic acid group.

<10> An electrical conductor formed of the electroconductive composition which is described in any one of <1> to <9>.

<11> The electrical conductor described in <10>, in which film thickness is 20 to 100 nm, a surface resistance value is $1\times10^{10}$ Ω/sq. or less at temperature of 25° C. and humidity of 50%, and a change in surface resistance value is 10 times or less after a week in an environment with temperature of 25° C. and humidity of 50%.

<12> The electrical conductor described in <10>, in which film thickness is 20 to 100 nm, a surface resistance value is $1\times10^{10}$ Ω/sq. or less at temperature of 25° C. and humidity of 50%, and a change in surface resistance value is 10 times or less after immersion for 10 minutes in water at temperature of 25° C. followed by drying.

<13> A laminate having the electrical conductor described in any one of <10> to <12> laminated on at least one surface of a substrate.

<14> A method for manufacturing a laminate including applying the electroconductive composition described in <3> on at least one surface of a substrate and heating and drying it to form an electrical conductor.
<15> An electroconductive film provided with the electrical conductor described in any one of <10> to <12>.
<16> A solid electrolyte condenser provided with a positive electrode consisting of a porous body of a valve metal, a dielectric layer formed by oxidation of a surface of the positive electrode, and one or more solid electrolyte layers formed on a surface side of the dielectric layer, in which at least one layer of the solid electrolyte layers is formed of the electroconductive composition described in any one of <1> to <9>.
<17> The solid electrolyte condenser described in <16>, in which the electroconductive polymer (A) satisfies the following condition (a):
Condition (a): volume average particle diameter of the minimum particle diameter distribution, which includes a peak with the minimum particle diameter among one or more peaks that are obtained by using an electroconductive polymer solution containing the electroconductive polymer (A) at 1% by mass and measuring particle diameter distribution based on dynamic light scattering method, is less than 26 nm.

Effect of the Invention

The electroconductive composition of the present invention has a high electroconducting property and it allows production of an electrical conductor with excellent water resistance.

Furthermore, according to the solid electrolyte condenser of the present invention, the electroconductive polymer is sufficiently impregnated even in the inside of a positive electrode having a dielectric layer, and it has high durability. Furthermore, because at least one solid electrolyte layer of the solid electrolyte condenser of the present invention is formed of the electroconductive composition of the present invention, it also has excellent water resistance.

MODE(S) FOR CARRYING OUT THE INVENTION

Figure 1:
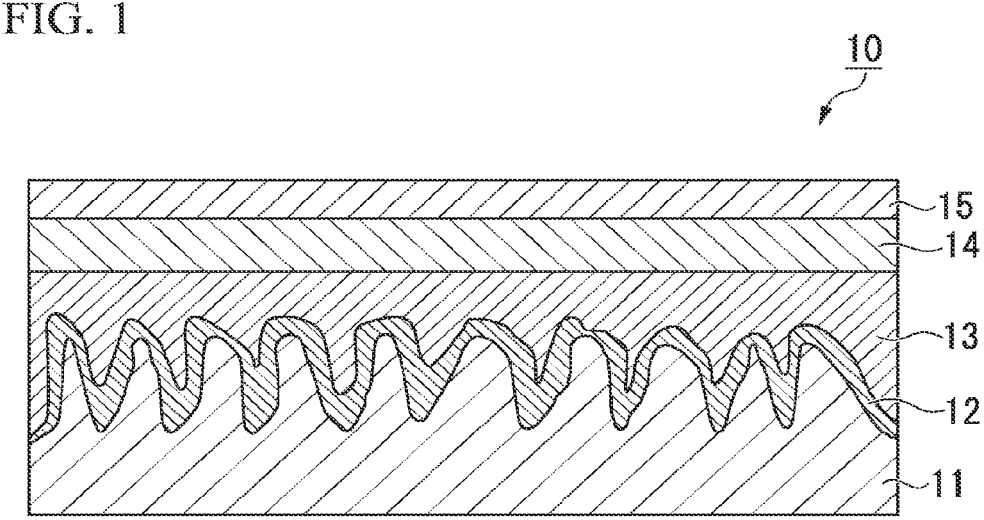
FIG. 1 is a cross-sectional view schematically illustrating one example of the solid electrolyte condenser of the present invention.

Hereinbelow, the present invention is described in detail.
Meanwhile, as described herein, the expression "soluble" or "water soluble" indicates that 0.1 g or more is homogeneously dissolved in 10 g (liquid temperature of 25° C.) of any one of water, water containing base and a basic salt, water containing acid, an organic solvent (for example, methyl alcohol, ethyl alcohol, and isopropyl alcohol), or a mixture thereof.
Furthermore, the expression "water dispersible" indicates the property of dispersing in water, and it means that a particle with average particle diameter of 5 nm to 1000 nm is floated and suspended in water or an organic solvent containing water.

Furthermore, the expression "electroconducting property" means that it has electric conductivity of $10^{-9}$ S/cm or more, or a coating film of film thickness of about 0.1 μm has surface resistance value of $10^{14}$ Ω/sq. or less.

Furthermore, as described herein, the expression "electroconductive polymer" indicates an electroconductive polymer or an electroconductive polymer and a dopant therefor.

Furthermore, as described herein, the expression "electroconductive polymer solution" indicates a solution in which an electroconductive polymer or an electroconductive polymer and a dopant therefor is dissolved or dispersed.

Furthermore, as described herein, the expression "impregnation" means that an electroconductive polymer is immersed (infiltrated) in the inside of fine irregularities of a dielectric layer, or somewhat immersed (infiltrated) in the inside of fine irregularities of the dielectric layer. The impregnation property can be relatively evaluated by observing a cross-section of a condenser under a scanning type electron microscope or the like.

Furthermore, as described herein, the "volume average particle diameter" means a value calculated by dynamic light scattering method, and it is also referred to as "hydrodynamic diameter."

"Electroconductive Composition"

The electroconductive composition of the present invention contains the electroconductive polymer (A) with a sulfonic acid group and/or a carboxylic acid group and the basic compound (B) having two or more nitrogen atoms. It is preferable that the electroconductive composition further contains the basic compound (C) having one nitrogen atom or the water soluble or water dispersible polymer (D) (with the proviso that the electroconductive polymer (A) is excluded).

<Electroconductive Polymer (A)>

The electroconductive polymer (A) has a sulfonic acid group and/or a carboxylic acid group (hereinbelow, it may be also referred to as a "carboxy group"). As the electroconductive polymer (A) has a sulfonic acid group and/or a carboxylic acid group, the water solubility and electroconducting property are improved.

Hereinbelow, the sulfonic acid group and a carboxylic acid group (carboxy group) may be collectively referred to as an "acidic group."

The electroconductive polymer (A) is preferably soluble in water or an organic solvent.

When the electroconductive polymer (A) is soluble in water or an organic solvent, the electrical conductor consisting of the electroconductive composition of the present invention can be formed by a simple method in which the electroconductive polymer (A) is dissolved in water or organic solvent to give an electroconductive composition and the solution is applied and dried on a substrate. Furthermore, although it is later described in detail, regarding the manufacture of a solid electrolyte condenser, according to simple method in which the electroconductive composition is applied and dried on a dielectric layer, a solid electrolyte layer having the electroconductive polymer (A) sufficiently impregnated even in the inside of fine irregularities of a dielectric layer can be formed.

The electroconductive polymer (A) is not particularly limited, if it has an acidic group, and any well-known electroconductive polymer may be used.

Specifically, examples thereof include electroconductive polymers having an acidic group, preferably a sulfonic acid group and/or a carboxyl group or their alkali metal salts, ammonium salts or substituted ammonium salts, an alkyl group or an alkyl group with an ether bond, substituted by a sulfonic acid group and/or a carboxyl group or their alkali metal salts, ammonium salts or substituted ammonium salts in at least one π-conjugated electroconductive polymer selected from a group consisting of polyphenylene vinylene, polyacetylene, polythiophene, polypyrrole, polyaniline, polyisothianaphthene, polyfuran, polycarbazole, polydiaminoanthraquinone and polyindole, which are unsubstituted or substituted.

Furthermore, examples thereof include electroconductive polymers having an acidic group, preferably a sulfonic acid group and/or a carboxyl group or their alkali metal salts, ammonium salts or substituted ammonium salts, an alkyl group or an alkyl group with an ether bond, substituted by a sulfonic acid group and/or a carboxyl group or their alkali metal salts, ammonium salts or substituted ammonium salts on a nitrogen atom of the π-conjugated electroconductive polymer.

Among them, electroconductive polymers having a skeleton of polythiophene, polypyrrole, polyaniline, polyphenylene vinylene or polyisothianaphthene are preferred. Especially preferred is such an electroconductive polymer that contains at least one type of repeating unit, selected from among those as shown in general formulas (2) to (4) below, at 20 to 100 mol % relative to the total number of units in the entire electroconductive polymer.

[Chem. 2]

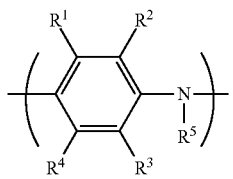

(2)

[Chem. 3]

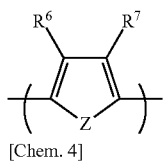

(3)

[Chem. 4]

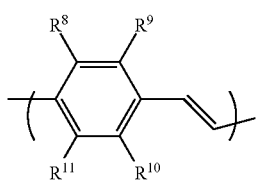

(4)

In the formulas (2) to (4) above, Z indicates a sulfur atom or a nitrogen atom, $R^1$ to $R^{11}$ each independently is selected from a group consisting of a hydrogen atom, a linear or branched alkyl group with 1 to 24 carbon atoms, a linear or branched alkoxy group with 1 to 24 carbon atoms, an acidic group, a hydroxy group, a nitro group, a halogen atom, $—N(R^{12})_2$, $—NHCOR^{12}$, $—SR^{12}$, $—OCOR^{12}$, $—COOR^{12}$, $—COR^{12}$, $—CHO$, and $—CN$, and $R^{12}$ represents a linear or branched alkyl group, an aryl group, or an aralkyl group with 1 to 24 carbon atoms.

Meanwhile, at least one of $R^1$ to $R^5$ in the formula (2), at least one of $R^6$ to $R^7$ in the formula (3), and at least one of $R^8$ to $R^{11}$ in the formula (4) is an acidic group.

As described herein, the "acidic group" indicates a sulfonic acid group or a carboxylic acid group.

The sulfonic acid group may be contained in the form of acid ($—SO_3H$) or in the form of ion ($—SO_3^-$). In addition, the sulfonic acid group includes a substituent group having a sulfonic acid group ($—R^{13}SO_3H$), and also an alkali metal salt, ammonium salt or substituted ammonium salt of a sulfonic acid group.

Meanwhile, the carboxylic acid group may be contained in the form of acid ($—COOH$) or in the form of ion ($—COO^-$). In addition, the carboxylic acid group includes a substituent group having a carboxylic acid group ($—R^{13}COOH$), and also an alkali metal salt, ammonium salt or substituted ammonium salt of a carboxylic acid group.

Herein, $R^{13}$ represents a linear or branched alkylene group, an arylene group, or an aralkylene group with 1 to 24 carbon atoms.

Examples of the alkyl group include a methyl group, an ethyl group, a n-propyl group, an iso-propyl group, a n-butyl group, an iso-butyl group, a sec-butyl group, a tert-butyl group, a dodecyl group, and a tetracosyl group.

Examples of the alkoxy group include a methoxy group, an ethoxy group, a n-propoxy group, an iso-propoxy group, a n-butoxy group, an iso-butoxy group, a sec-butoxy group, a tert-butoxy group, a heptoxy group, a hexoxy group, an octoxy group, a dodecoxy group, and a tetracoxy group.

Examples of the halogen atom include a fluorine atom, a chlorine atom, a bromine atom, and an iodine atom.

As for the electroconductive polymer (A), the polymer having a unit represented by the above general formula (2) is preferable. In particular, from the viewpoint of exhibiting a high electroconducting property, an electroconductive polymer having a unit represented by the following general formula (1) is preferable.

[Chem. 5]

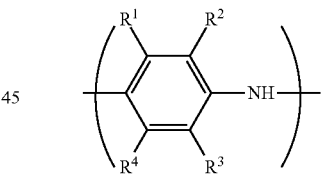

(1)

In the formula (1), $R^1$ to $R^4$ are each independently selected from a group consisting of a hydrogen atom, a linear or branched alkyl group with 1 to 24 carbon atoms, a linear or branched alkoxy group with 1 to 24 carbon atoms, an acidic group, a hydroxy group, a nitro group, and a halogen atom, and at least one of $R^1$ to $R^4$ is an acidic group.

As for the unit represented by the above general formula (1), a unit in which any one of $R^1$ to $R^4$ is a linear or branched alkoxy group having 1 to 4 carbon atoms, any other one of them is a sulfonic acid group, and the rest of them are a hydrogen atom is preferable from the viewpoint of having easy production.

The electroconductive polymer (A) preferably contains the unit represented by the general formula (1) at 20 to 100 mol % in the total number of the units of entire polymer. In particular, it preferably contains the unit represented by the following general formula (5) at 20 to 100 mol % in the total number of the units of entire polymer.

[Chem. 6]

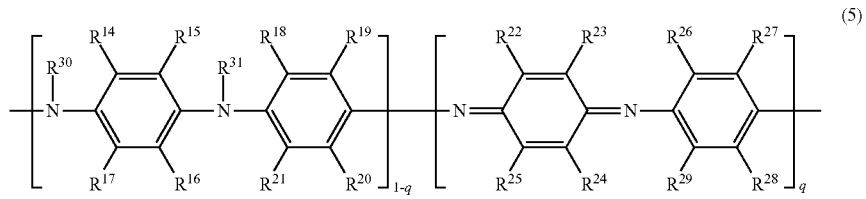

In the formula (5), q is an any number of $0<q<1$, $R^{14}$ to $R^{31}$ are each independently selected from a group consisting of a hydrogen atom, a linear or branched alkyl group with 1 to 24 carbon atoms, a linear or branched alkoxy group with 1 to 24 carbon atoms, an acidic group, a hydroxy group, a nitro group, a halogen atom, $-N(R^{12})_2$, $-NHCOR^{12}$, $-SR^{12}$, $-OCOR^{12}$, $-COOR^{12}$, $-COR^{12}$, $-CHO$, and $-CN$, and $R^{12}$ represents a linear or branched alkyl group, an aryl group, or an aralkyl group with 1 to 24 carbon atoms.

Meanwhile, at least one of $R^{14}$ to $R^{31}$ is an acidic group.

Among the electroconductive polymer (A) described above, from the viewpoint of the solubility, an electroconductive polymer in which content of a unit having a sulfonic acid group and/or a carboxylic acid group is 50 mol % or more relative to the total unit number in entire polymer is preferable. An electroconductive polymer in which content of a unit having a sulfonic acid group and/or a carboxylic acid group is 70 mol % or more relative to the total unit number in entire polymer is more preferable. An electroconductive polymer in which content of a unit having a sulfonic acid group and/or a carboxylic acid group is 90 mol % or more relative to the total unit number in entire polymer is even more preferable. An electroconductive polymer in which content of a unit having a sulfonic acid group and/or a carboxylic acid group is 100 mol % or more relative to the total unit number in entire polymer is particularly preferable.

Furthermore, from the viewpoint of having an excellent electroconducting property, the electroconductive polymer (A) preferably has 10 or more units represented by the general formula (1) in one molecule.

Furthermore, from the viewpoint of the electroconducting property and solubility, at least one substituent group added on the aromatic ring is preferably an alkyl group, an alkoxy group, and a halogen atom. It is particularly preferably an alkoxy group having an electron donating property. Among those combinations, the most preferred electroconductive polymer (A) is represented by the following general formula (6).

[Chem. 7]

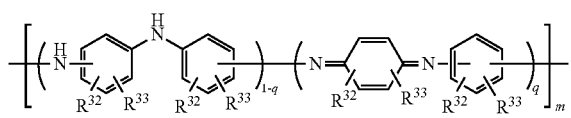

In the formula (6), q is an any number of $0<q<1$, m represents polymerization degree of from 3 to 5000, $R^{32}$ is an acidic group, and $R^{33}$ is selected from a group consisting of a linear or branched alkyl group with 1 to 24 carbon atoms, a linear or branched alkoxy group with 1 to 24 carbon atoms, and a halogen atom.

Meanwhile, regarding the formula (6), $R^{32}$ is preferably an acidic group in which at least part of $R^{32}$ does not form a salt.

In addition, regarding the structural units other than the unit shown by the general formula (1) above, as long as the solubility, electroconducting property, and other properties are not affected, the electroconductive polymer (A) may also contain at least one unit selected from substituted or unsubstituted aniline, thiophene, pyrrole, phenylene, vinylene, divalent unsaturated groups and divalent saturated groups.

As for the compound having the unit represented by the above general formula (1), poly(2-sulfo-5-methoxy-1,4-iminophenylene) is particularly preferable from the viewpoint of having excellent solubility.

The electroconductive polymer (A) can be obtained by various synthesizing methods, such as, a chemical polymerization or electrolytic polymerization. For example, the synthetic method described in JP 07-324132 A, JP 07-196791 A, or JP 10-158395 A can be employed.

Namely, by polymerizing one compound selected from the aniline substituted with an acidic group as represented by the following general formula (7), an alkali metal salt thereof, an ammonium salt, or a substituted ammonium salt thereof in a solution containing a basic compound in the presence of an oxidizing agent, the electroconductive polymer (A) can be obtained.

[Chem. 8]

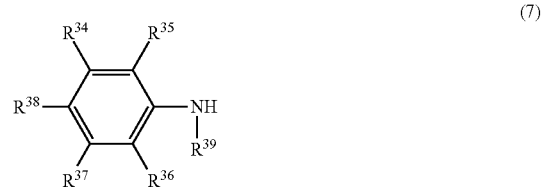

In the formula (7), $R^{34}$ to $R^{39}$ are each independently selected from a group consisting of a hydrogen atom, a linear or branched alkyl group with 1 to 24 carbon atoms, a linear or branched alkoxy group with 1 to 24 carbon atoms, an acidic group, a hydroxy group, a nitro group, a halogen atom, $-N(R^{12})_2$, $-NHCOR^{12}$, $-SR^{12}$, $-OCOR^{12}$, $-COOR^{12}$, $-COR^{12}$, $-CHO$, and $-CN$, and $R^{12}$ represents a linear or branched alkyl group, an aryl group, or an aralkyl group with 1 to 24 carbon atoms.

Meanwhile, at least one of $R^{34}$ to $R^{39}$ is an acidic group.

Particularly preferred electroconductive polymer (A) is an electroconductive polymer which is obtained by polymerization of an alkoxy group-substituted aminobenzene sulfonic acid, an alkali metal salt thereof, an ammonium salt, or a substituted ammonium salt thereof in a solution containing a basic compound in the presence of an oxidizing agent, It is preferable that at least part of the acidic group of the electroconductive polymer (A) is in free acid form from the viewpoint of enhancing the electroconducting property.

Furthermore, the weight average molecular weight of the electroconductive polymer (A) is, from the viewpoint of the electroconducting property, film forming property, and film strength, preferably 2000 to 3000000, more preferably 3000 to 1000000, even more preferably 5000 to 500000, and particularly preferably 30000 to 100000.

The weight average molecular weight of the electroconductive polymer (A) is weight average molecular weight converted in terms of sodium polystyrene sulfonate, which is measured by gel permeation chromatography (GPC).

The electroconductive polymer (A) preferably satisfies the following condition (a).

Condition (a): volume average particle diameter of the minimum particle diameter distribution, which includes a peak with the minimum particle diameter among one or more peaks that are obtained by using an electroconductive polymer solution containing the electroconductive polymer (A) at 1% by mass and measuring particle diameter distribution based on dynamic light scattering method, is less than 26 nm.

When the electroconductive polymer (A) satisfies Condition (a), that is, the volume average particle diameter of the electroconductive polymer (A) is less than 26 nm, the electroconductive polymer (A) can be more sufficiently impregnated in the inside of fine irregularities of a dielectric layer, and thus, in terms of manufacturing of a solid electrolyte condenser, it becomes easier to obtain a solid electrolyte condenser having higher electric capacitance exhibition rate. From the viewpoint of enhancing the impregnation property, the volume average particle diameter of the electroconductive polymer (A) is more preferably 20 nm or less, even more preferably 10 nm or less, and particularly preferably 5 nm or less.

The electroconductive composition which contains the electroconductive polymer (A) satisfying Condition (a) is particularly preferable for forming a solid electrolyte layer of a solid electrolyte condenser.

The volume average particle diameter of the electroconductive polymer (A) is a value which is measured as follows.

First, an electroconductive polymer solution in which the electroconductive polymer (A) has concentration of 1% by mass is prepared, and a particle distribution is measured by a dynamic light scattering method using a dynamic light scattering particle diameter-measuring device. Calibration is made by using the viscosity of pure water.

Then, among one or more peaks obtained therefrom, volume average particle diameter of the minimum particle distribution including a peak having the minimum particle diameter is obtained, and it is used as the volume average particle diameter of the electroconductive polymer (A).

Meanwhile, as described herein, the "minimum particle distribution" is the distribution with the smallest particle diameter among one or more particle distribution groups that are obtained by measuring the particle distribution by a dynamic light scattering method, calibrating it with the viscosity of pure water, and analyzing the result.

Figure 3:
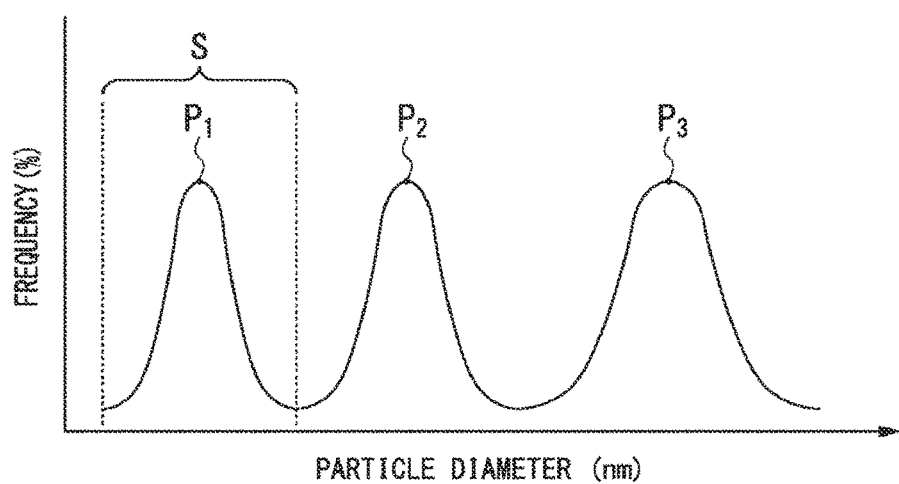
FIG. 3 is a drawing schematically illustrating the particle distribution of the electroconductive polymer which is measured by dynamic light scattering method.

In detail, it is a particle distribution including a peak $P_1$ that has a minimum particle diameter (region with symbol S in FIG. 3) among one or more peaks, $P_1, P_2, P_3, \ldots$ that are obtained by measuring particle distributions as illustrated in FIG. 3. When the peak obtained by measuring the particle distribution with a dynamic light scattering method is one, such a particle distribution corresponds to the minimum particle distribution. In addition, when a plurality of particle distributions are overlapped, the particle distributions are subjected to a wave-form separation according to a general interpretation method using a Gauss function or a Lorentz function that is added in wide use software, and the like.

<Basic Compound (B) Having Two or More Nitrogen Atoms>

The basic compound (B) is a compound having two or more nitrogen atoms.

As the electroconductive composition contains the basic compound (B), an ionic crosslinking structure is formed between the basic compound (B) and the acidic group of the electroconductive polymer (A). As a result, the obtained electrical conductor can have improved water resistance or durability.

As described above, in a related art, for improving the water resistance of an electrical conductor, an electroconductive composition of the related art is coated on a substrate to form an electrical conductor, which is then subjected to heating. However, as the acidic group of the electroconductive polymer is dissociated by heating, the electroconducting property is easily lowered.

However, with the electroconductive composition of the present invention, as an ionic crosslinking structure is formed between the basic compound (B) and the acidic group of the electroconductive polymer (A), the water resistance of the electrical conductor is improved.

The crosslinking reaction may progress not only under heating but also at room temperature. As such, after forming an electrical conductor by applying the electroconductive composition on a substrate, it is unnecessary to perform any heating.

Thus, the acidic group of the electroconductive polymer (A) is not likely to dissociate so that an electrical conductor having high electroconducting property can be produced.

Furthermore, with the electroconductive composition of the present invention, as the acidic group of the electroconductive polymer (A) and the basic part of the basic compound (B) form a salt by ionic bond, the acidic group of the electroconductive polymer (A) is not likely to dissociate even when the electrical conductor is subjected to heating.

As such, the electroconductive composition of the present invention can form an electrical conductor having excellent water resistance without compromising the electroconducting property even when it is stored at room temperature or subjected to heating.

Furthermore, when a solid electrolyte layer of a condenser is formed by using an electroconductive composition which contains the basic compound (B), the durability is improved. As such, even when a durability test like heating at the temperature higher than the temperature during the process of manufacturing condenser is performed, the electric capacitance is not likely to be lowered.

Herein, it is believed that the reason for having improved durability is as follows.

It is believed that, due to an influence of heat on the electroconductive polymer (A), the solid electrolyte layer is physically deteriorated (film cracking or the like) or the acidic group of the electroconductive polymer (A) is dissociated, for example, and thus the electroconducting property is lowered to yield a decrease in electric capacitance according to heating or the like.

As the basic compound (B) has two or more nitrogen atoms, a stable network is formed, via at least one of intramolecular and intermolecular interactions, between a side chain of the electroconductive polymer (A) and two or more nitrogen atoms of the basic compound (B).

As a result, as it is unlikely for electroconductive polymer (A) to be influenced by heat, it is believed that the heat resistance is improved.

Examples of the basic compound (B) include a pyridine derivative substituted with a tertiary amino group such as 2-aminopyridine, 3-aminopyridine, 4-aminopyridine; 2,6-diaminopyridine, 2,3-diaminopyridine, 3,4-diaminopyridine; 4-dimethylaminopyridine, 4-dimethylaminomethylpyridine, or 3,4-bis(dimethylamino)pyridine; 1,5-diazabicyclo[4.3.0]-5-nonene (DBN), 1,8-dilazabicyclo [5.4.0]-7-undecene (DBU), polyvinylpyridine, and a derivative thereof; aliphatic diamines such as hydrazine, methylene diamine, ethylene diamine, diaminopropane, diaminobutane, diaminopentane, diaminohexane, or diaminoheptane; polyvalent pyridine compound having two or more pyridine rings in the molecule like bipyridyl; polyvalent quinoline compound having two or more quinoline rings in the molecule; polyvalent pyrrole having two or more pyrroles in the molecule; and a polyamine compound such as polyallylamine and polyvinylpyridine.

The basic compound (B) may be used either singly or two or more kinds of them can be used after mixing at any ratio.

Boiling point of the basic compound (B) is preferably 120° C. or higher and more preferably 130° C. or higher. As the boiling point is 120° C. or higher, the heat resistance is improved.

Furthermore, the base dissociation constant (pKb) of the basic compound (B) at 25° C. is preferably 4.5 or more. As the base dissociation constant (pKb) is 4.5 or more, the water resistance can be provided while maintaining the high electroconducting property.

Meanwhile, the base dissociation constant (pKb) and acid dissociation constant (pKa) that is described later are the values described in "Basic Volume II, Chemistry manual" (Chemical Society of Japan, published by Maruzen on Showa 41. 9. 25).

From the viewpoint of having improved water resistance or durability or improved performances or the like when prepared as a condenser, the basic compound (B) preferably has a conjugated structure. Furthermore, the conjugated structure of the basic compound (B) preferably has a cyclic structure from the viewpoint of maintaining the electroconducting property based on forming of intramolecular and intermolecular network. Examples of the cyclic structure include an aromatic structure and an alicyclic structure.

Furthermore, from the viewpoint of stability of the electroconductive composition, the basic compound (B) preferably has two or more nitrogen-containing heterocycles.

(Basic Compound (B-1) Having Two or More Nitrogen Atoms and Also Cyclic Structure as Basic Compound with Conjugated Structure)

The electroconductive composition preferably contains the compound (B-1) having two or more nitrogen atoms and also cyclic structure as basic compound with conjugated structure Namely, the basic compound (B-1) is a basic compound which has two or more nitrogen atoms, a conjugated structure, and a cyclic structure.

It is believed that, as the two basic groups with a nitrogen atom in the basic compound (B-1) can form an ionic crosslinking structure without significantly compromising doping of the electroconductive polymer (A) compared to a basic group of a compound which has no conjugated structure or cyclic structure of the basic compound (B), the water resistance, durability, and condenser performance are greatly improved.

Furthermore, from the viewpoint of improving the water resistance, durability, and condenser performance, among the basic compound (B-1), the basic compound (B-2) in which the above cyclic structure has a conjugated structure is more preferable. More preferably, it is the basic compound (B-3) in which one or more nitrogen atoms are present in the cyclic structure with a conjugated structure and also there are one or more nitrogen atoms other than the cyclic structure.

Furthermore, the basic compounds (B) and (B-1) to (B-3) are preferably a compound which has primary, secondary, and tertiary amino group and a heterocyclic group in the same molecule. They are more preferably a compound which has primary, secondary, and tertiary amino group and a nitrogen-containing heterocyclic group in the same molecule.

Specific examples of those compounds include a nitrogen-containing heterocyclic derivative in which any one of primary, secondary, and tertiary amino groups is substituted.

Examples of the nitrogen-containing heterocyclic derivative in which the primary amino groups are substituted include aminopyridines such as 2-aminopyridine, 3-aminopyridine, or 4-aminopyridine, aminopyrimidines such as 2-aminopyrimidine, 4-aminopyrimidine, or 5-aminopyrimidine, diaminopyrimidines such as 2,4-diaminopyrimidine or 2,5-diaminopyrimidine, triaminopyrimidines such as 2,4,6-triaminopyrimidine, aminopyrazines such as 2-aminopyrazine or 3-aminopyrazine, diaminopyrazines such as 2,4-diaminopyrazine, 2,3-diaminopyrazine, or 2,5-diaminopyrazine, triaminopyrazines such as 2,3,5-triaminopyrazine, triazines such 2-aminotriazine, diaminotriazines such as 2,4-diaminotriazine, triaminotriazines such as 2,4,6-triaminotriazine (common name: melamine), guanamines such as acetoguanamine or benzoguanamine, aminopyrroles such as 2-aminopyrrole or 3-aminopyrrole, aminoquinolines such as 2-aminoquinoline, 3-aminoquinoline, 4-aminoquinoline, 5-aminoquinoline, 6-aminoquinoline, 7-aminoquinoline, or 8-aminoquinoline, aminoanthracenes, and a compound having an amino group substituted with an alkyl group of alkylpyridine like picolylamine.

Examples of the nitrogen-containing heterocyclic derivative in which the secondary amino groups is substituted include alkylaminopyridines such as 2-methylaminopyridine, 3-methylaminopyridine, or 4-methylaminopyridine, alkylaminopyrroles such as 2-alkylaminopyrrole or 3-alkylaminopyrrole, alkylaminoquinolines such as 2-alkylaminoquinoline, 3-alkylaminoquinoline, 4-alkylaminoquinoline, 5-alkylaminoquinoline, 6-alkyl aminoquinoline, 7-alkylaminoquinoline, or 8-alkylaminoquinoline, aralkylaminoanthracenes, and a compound having an alkylamino group substituted with alkylpyridine like picolylalkylamine.

Examples of the nitrogen-containing heterocyclic derivative in which the tertiary amino groups is substituted include dialkylaminopyridines such as 2-dimethylaminopyridine, 3-dimethylaminopyridine, or 4-dimethylaminopyridine, dialkylaminopyrrols such as 2-dialkylaminopyrrole or 3-dialkylaminopyrrole, dialkylaminoquinolines such as 2-dialkylaminoquinoline, 3-dialkylaminoquinoline, 4-dialkylaminoquinoline, 5-dialkylaminoquinoline, 6-dialkylaminoquinoline, 7-dialkylaminoquinoline, or 8-dialkylaminoquinoline, dialkylaminoanthracenes, and a compound having a dialkylamino group substituted with alkylpyridine like picolyldialkylamine.

Among those compounds, from the viewpoint of the water resistance, aminopyridines such as aminopyridine, methylaminopyridine, dimethylaminopyridine, or diaminopyridine, aminopyrimidines, diaminopyrimidines, triaminopyrimidines, aminopyrazines, di aminopyrazines, triaminopyrazines, aminotriazines, diaminotriazines, triaminotriazines, phenanthrolines, and aminoquinolines are particularly preferable. Furthermore, from the viewpoint of the durability and condenser performance, aminopyridines, alkylaminopyridines, dialkylaminopyridines, aminoquinolines, alkylaminoquinolines, and dialkylaminoquinolines are particularly preferable.

Those compounds may be used either singly or two or more kinds of them can be used after mixing at any ratio.

(Basic Compound (B-4) Having Two or More Nitrogen Atoms and Also Two or More Nitrogen-Containing Heterocycles)

The electroconductive composition preferably contains the compound (B-4) having two or more nitrogen atoms and also two or more nitrogen-containing heterocycles.

Namely, the basic compound (B-4) is a basic compound which has two or more nitrogen atoms and also two or more nitrogen-containing heterocycles.

It is believed that, as the basic compound (B-4) has weaker ionic bonding force in a solution compared to a compound not having two or more nitrogen atoms in the basic compound (B), stability of the electroconductive composition is improved.

Examples of the basic compound (B-4) include a polyvalent pyridine compound having two or more pyridine rings in the molecule like bipyridyl; polyvalent quinoline compound having two or more quinoline rings in the molecule; polyvalent pyrrole having two or more pyrroles in the molecule; and a polyamine compound such as polyvinylpyridine. Among them, a compound having two or more pyridine rings in the molecule is preferable, and specific examples thereof include polyvalent pyridines and polyvinylpyridine.

Content of the basic compound (B) is, from the viewpoint of improving the water resistance of an electrical conductor formed of the electroconductive composition, preferably an amount to have the basic compound (B) of 10 to 150 mol %, more preferably 20 to 130 mol %, and particularly preferably 30 to 130 mol % relative to 100 mol % of an acidic group of the electroconductive polymer (A).

<Basic Compound (C) Having One Nitrogen Atom>

The basic compound (C) is a compound having one nitrogen atom.

As described above, the basic compound (B) forms an ionic crosslinking structure with an acidic group of the electroconductive polymer (A). Because the crosslinking reaction occurs also at room temperature, an ionic crosslinking structure is formed in part even in an electroconductive composition state. As a result, depending on the type or content of the basic compound (B), a crosslinked product between the basic compound (B) and the electroconductive polymer (A) is precipitated, and it may become difficult to maintain good stability of the electroconductive composition.

If the electroconductive composition contains the basic compound (C), an occurrence of precipitates is suppressed so that good stability of the electroconductive composition can be maintained.

Herein, it is believed that the reason for having improved stability is as follows.

Before the basic compound (B), the basic compound (C) forms an ionic crosslinking structure with an acidic group of the electroconductive polymer (A). When the basic compound (C) is present in an electroconductive composition, the crosslinking reaction between the basic compound (B) and the electroconductive polymer (A) is prevented by the basic compound (C). It is thus believed that, as an occurrence of precipitates is suppressed, good stability of the electroconductive composition is maintained. Meanwhile, because the crosslinking product between basic compound (C) and the electroconductive polymer (A) is not easily precipitated, it is believed that, even when an ionic crosslinking structure is formed between the basic compound (C) and an acidic group of the electroconductive polymer (A), the stability of the electroconductive composition is hardly affected by it.

Furthermore, although it is described later in detail, when the electroconductive composition forms an electrical conductor or a solid electrolyte layer, at least part of the basic compound (C) vaporizes according to drying by heating. As the basic compound (C) vaporizes, the acidic group of the freed electroconductive polymer (A) and the basic compound (B) undergo a crosslinking reaction to form an ionic crosslinking structure, and thus the water resistance or durability can be exhibited.

Boiling point of the basic compound (C) is preferably lower than the boiling point of the basic compound (B). As described above, the acidic group of the electroconductive polymer (A) and the basic compound (B) undergo a crosslinking reaction as the basic compound (C) vaporizes according to drying by heating, it is preferable that the basic compound (C) is easily vaporized. When the boiling point of the basic compound (C) is lower than the boiling point of the basic compound (B), the basic compound (C) can easily vaporize during drying by heating.

The boiling point of the basic compound (C) is preferably lower by 5° C. than the boiling point of the basic compound (B). More preferably, it is lower by 10° C.

The boiling point of the basic compound (C) is preferably 130° C. or lower.

Furthermore, the base dissociation constant (pKb) of the basic compound (C) at 25° C. is preferably lower than the base dissociation constant (pKb) of the basic compound (B) at 25° C. When the base dissociation constant (pKb) of the basic compound (C) is lower than the base dissociation constant (pKb) of the basic compound (B), that is, when the acid dissociation constant (pKa) of the basic compound (C) is higher than the acid dissociation constant (pKa) of the basic compound (B), the basic compound (C) can form, before the basic compound (B), an ionic crosslinking structure with an acidic group of the electroconductive polymer (A) in the electroconductive composition. Accordingly, the stability of the electroconductive composition is further improved.

Examples of the basic compound (C) include ammonia, primary alkylamines such as methylamine, ethylamine, n-propylamine, iso-propylamine, n-butylamine, isobutylamine, and tertiary butylamine; dialkylamines such as dimethylamine, diethylamine, dipropylamine, or dibutylamine; trialkylamines such as trimethylamine or trimethylamine; and pyridine derivatives such as pyridine, 2-picoline, and 3-picoline. Among them, particularly preferred are ammonia, methylamine, dimethylamine, trimethylamine, and triethylamine, which are a base with high pKa and low boiling point.

Content of the basic compound (C) is, from the viewpoint of improving the stability of an electrical conductor formed of the electroconductive composition, preferably an amount to have the basic compound (C) of 10 to 120 mol %, and particularly preferably 20 to 100 mol % relative to 100 mol % of an acidic group of the electroconductive polymer (A).

<Water Soluble or Water Dispersible Polymer (D) Other than the Electroconductive Polymer (A)>

As for the water soluble or water dispersible polymer (D), a thermoplastic, thermosetting water soluble polymer, or a macromolecule compound which can form an emulsion in aqueous system is used.

As the water soluble or water dispersible polymer (D) is included in an electroconductive composition, not only the water resistance of an electrical conductor to be obtained is improved but also the adhesiveness to a substrate is improved.

As for the water soluble or water dispersible polymer (D), it is not particularly limited if it can be dissolved or dispersed in the solvent (E) described below, but examples thereof include those described below.

Furthermore, from the viewpoint of the durability, those having weight average molecular weight of 5000 or more, and preferably 10000 or more are preferably used as the water soluble or water dispersible polymer (D).

Specific examples of the water soluble polymer include polyvinyl alcohols such as polyvinyl alcohol, polyvinyl formal, and polyvinyl butyral, a water soluble nylon resin, a water soluble alkyd resin, a water soluble melamine resin, a water soluble urea resin, a water soluble phenol resin, a water soluble epoxy resin, a water soluble polybutadiene resin, a water soluble acrylic resin, a water soluble urethane resin, a water soluble acrylic/styrene resin, a water soluble vinyl acetate/acrylic copolymerization resin, a water soluble polyester resin, a water soluble styrene/maleic acid copolymerization resin, a water soluble fluororesin, a water soluble polyisocyanate resin, and a copolymer thereof.

Specific examples of the water dispersible polymer include a macromolecule compound capable of forming an emulsion in aqueous system such as an aqueous alkyd resin, an aqueous melamine resin, an aqueous urea resin, an aqueous phenol resin, an aqueous epoxy resin, an aqueous polybutadiene resin, an aqueous acrylic resin, an aqueous urethane resin, an aqueous acrylic/styrene resin, an aqueous vinyl acetate/acrylic copolymerization resin, an aqueous polyester resin, an aqueous styrene/maleic acid copolymerization resin, an aqueous fluororesin, an aqueous vinyl acetate resin, an aqueous nylon resin, an aqueous polyisocyanate resin, or a copolymer thereof.

Content of the water soluble or water dispersible polymer (D) is, from the viewpoint of improving the water resistance, film forming property, molding property, and strength of an electrical conductor, preferably 0.1 to 50000 parts by mass and more preferably 0.5 to 10000 parts by mass in terms of solid matter, relative to 100 parts by mass of the solid matter of the electroconductive polymer (A).

<Solvent (E)>

The electroconductive composition preferably contains the solvent (E).

The solvent (E) is not particularly limited if it can dissolve or disperse the electroconductive polymer (A).

Examples of the solvent (E) which is preferably used include water, alcohols such as methanol, ethanol, isopropyl alcohol, propyl alcohol, or butanol; ketones such as acetone, methyl ethyl ketone, ethyl isobutyl ketone, methyl isobutyl ketone, ethylene glycols such as ethylene glycol, ethylene glycol methyl ether, or ethylene glycol mono-n-propyl ether; propylene glycols such as propylene glycol, propylene glycol methyl ether, propylene glycol ethyl ether, propylene glycol butyl ether, or propylene glycol propyl ether; amides such as dimethylformamide, or dimethylacetamide; pyrrolidones such as N-methylpyrrolidone, or N-ethylpyrrolidone; hydroxyl esters such as methyl lactate, ethyl lactate, methyl β-methoxyisobutyrate or methyl α-hydroxyisobutyrate; and γ-butyrolactone.

In particular, from the viewpoint of the solubility, water, and a mixture solvent of water and an organic solvent are preferably used.

When a mixture solvent of water and an organic solvent is used as the solvent (E), content of the organic solvent in 100% by mass of the mixture solvent is preferably 1 to 70% by mass, and more preferably 3 to 30% by mass. When the content of an organic solvent is within this range, the electroconductive polymer (A) is particularly well dissolved.

Herein, from the viewpoint of the electroconducting property and smoothness of an electrical conductor, content of the solvent (E) is, relative to 100 parts by mass of the solid matter of the electroconductive polymer (A), preferably 200 to 100000 parts by mass, and more preferably 500 to 100000 parts by mass.

When the content of the solvent (E) is 200 parts by mass or more, a sufficient solubility is obtained so that it becomes easier to obtain an electrical conductor with smooth surface.

<Other Components>

Other than the electroconductive polymer (A), the basic compound (B), the basic compound (C), the water soluble or water dispersible polymer (D), and the solvent (E), a known additive such as an electroconductive polymer other than the electroconductive polymer (A) (hereinbelow, referred to as "other electroconductive polymer") can be included in the electroconductive composition, within the range in which it does not adversely affect the effect of the present invention.

Examples of other electroconductive polymer include poly(3,4-ethylenedioxythiophene) or a derivative thereof, polypyrrole or a derivative thereof, and polyaniline or a derivative thereof.

Furthermore, when other electroconductive polymers are used, dopants (for example, polystyrene sulfonic acid, and the like) are preferably used in combination.

Examples of the additives include a crosslinking agent, a plasticizer, a dispersing agent, a fluidity modifying agent, a surfactant, a lubricating agent, a surfactant, a UV absorbing agent, a storage stabilizer, an adhesive aid, a thickening agent, a leveling agent, an anti-static agent, an inorganic filler, a slip agent, and an organic filler.

Examples of the crosslinking agent include isocyanates such as block isocyanate, a carbodiimide compound, an epoxy compound, and a melamine compound.

Examples of the surfactant include an anionic surfactant, a cationic surfactant, an amphoteric surfactant, a nonionic surfactant, and a fluorine-based surfactant, and the like.

The additives such as crosslinking agent or surfactant may be used either singly or two or more kinds of them can be used after mixing at any ratio.

<Working Effect>

The electroconductive composition of the present invention which is described above contains both the electroconductive polymer (A) and the basic compound (B), and thus it has a high electroconducting property and can form an electrical conductor with excellent water resistance.

Furthermore, when the electroconductive composition of the present invention is used for producing a solid electrolyte condenser, the electroconductive polymer (A) can be sufficiently impregnated even in the inside of the positive electrode having a dielectric layer. Accordingly, a solid electrolyte layer can be formed even in the inside of fine irregularities of a dielectric layer. Thus, a solid electrolyte condenser having high electric capacitance exhibition rate, high durability, and excellent water resistance is obtained.

The electroconductive composition of the present invention is preferably used for an electroconductive film or a fixed electrolyte condenser.

"Electrical Conductor, Laminate"

The electrical conductor of the present invention consists of the electroconductive composition of the present invention. The electrical conductor is formed by applying the electroconductive composition on a substrate followed by drying, for example.

According to the laminate of the present invention, the electrical conductor of the present invention is laminated on at least one surface of a substrate.

As for the substrate, plastics, wood, paper, ceramics, or a film thereof, or a glass sheet or the like is used.

Among them, from the viewpoint of the adhesiveness, plastics and a film thereof are preferably used.

Examples of the macromolecule compound which is used for plastics or a film thereof include polyethylene, polyvinyl chloride, polypropylene, polystyrene, ABS resin, AS resin, methacrylic resin, polybutadiene, polycarbonate, polyarylate, polyvinylidene fluoride, polyester, polyamide, polyimide, polyaramide, polyphenylene sulfide, polyether ether ketone, polyphenylene ether, polyether nitrile, polyamide-imide, polyether sulfone, polysulfone, polyether imide, polyethylene terephthalate, polybutylene terephthalate, and polyurethane.

A corona surface treatment or a plasma treatment can be performed in advance on a film surface on which an electrical conductor is formed so that the adhesiveness of the plastic substrate or film to an electrical conductor can be improved.

In addition, on a coating film surface of oxides of aluminum, tantalum, or niobium that is used for an electrode of a condenser, the electroconductive composition can be applied to form an electrical conductor.

For applying the electroconductive composition on a substrate, methods generally used for applying coating material can be employed. For example, coating methods such as gravure coater, roll coater, curtain flow coater, spin coater, bar coater, reverse coater, kiss-roll coater, fountain coater, rod coater, air doctor coater, knife coater, blade coater, cast coater, or screen coater, spray methods such as spray coating, immersion methods such as dipping and the like can be used.

After applying the electroconductive composition on a substrate to form a coating film, the coating film can be directly dried by allowing it stand at room temperature. Alternatively, it can be dried by heating the coating film.

When the coating film is heated, the crosslinking reaction between the basic compound (B) and the acidic group of the electroconductive polymer (A) is promoted in accordance with drying, and thus the electrical conductor can be provided with water resistance within relatively short time. In particular, when the basic compound (C) described above is contained in the electroconductive composition, drying by heating is preferable. According to drying by heating, the basic compound (C) can more easily vaporize, so that the ionic crosslinking structure between the basic compound (B) and the acidic group of the electroconductive polymer (A) is more easily formed. In addition, as vaporization of the solvent (E) is also promoted, the electroconducting property of an electrical conductor is further improved.

Herein, the heating treatment temperature is preferably 300° C. or lower, more preferably 250° C. or lower, and particularly preferably 200° C. or lower.

When the heating treatment temperature is preferably 300° C. or lower, decomposition of the electroconductive polymer (A) itself is suppressed so that the electroconducting property can be maintained at good level.

<Working Effect>

The electrical conductor of the present invention which is described above consists of the electroconductive composition of the present invention. Furthermore, the laminate of the present invention has the electrical conductor of the present invention laminated on at least one surface of a substrate. As such, the electrical conductor and laminate of the present invention have a high electroconducting property and excellent water resistance, and it is preferable for a use in which water resistance is required.

Meanwhile, the electrical conductor has a tendency of having poorer electroconducting property as the film thickness decreases. For example, poly(3,4-ethylenedioxythiophene) generally used as an electroconductive polymer is expensive. Thus, considering the cost for producing an electrical conductor, it is difficult to increase the film thickness.

The electrical conductor also has a tendency of having poorer electroconducting property with the passage of time. It is believed to be caused by humidity.

On the other hand, the electroconductive polymer (A) to be contained in the electroconductive composition of the present invention can be produced at relatively low cost, and thus the film thickness of the electrical conductor can be increased to 20 to 100 nm or so when the electroconductive composition of the present invention is used.

Furthermore, by using the electroconductive composition of the present invention, an electrical conductor with high electroconducting property, specifically, an electrical conductor having, if film thickness is 20 to 100 nm, a surface resistance value (initial surface resistance value) of $1 \times 10^{10}$ Ω/sq. or less at temperature of 25° C. and humidity of 50% can be easily obtained.

In addition, because the electrical conductor of the present invention has excellent water resistance, it can maintain the electroconducting property even after lapse of time. For example, the surface resistance value after keeping the electrical conductor for a week in an environment with temperature of 25° C. and humidity of 50%, or the surface resistance value after immersion for 10 minutes in water at temperature of 25° C. followed by drying can be easily 10 times or less the initial surface resistance value.

In addition, according to the aforementioned method for manufacturing an electrical conductor, because the electroconductive composition of the present invention is used, an electrical conductor with high electroconducting property and excellent water resistance can be produced even when a coating film formed by applying the composition on a substrate is stored at room temperature or subjected to a heating treatment. In addition, because the electrical conductor obtained from the electroconductive composition of the present invention has water resistance, it is also preferable for a case in which an electrical conductor is formed by overlapped application of an electroconductive composition.

"Electroconductive Film"

The electroconductive film of the present invention is provided with the electrical conductor of the present invention.

Examples of the electroconductive film include a film having structure in which the electrical conductor of the present invention is laminated on one surface of a substrate, and an adhesive layer and a separator are laminated in order on the other surface of a substrate.

Examples of the substrate include the substrates which have been exemplified above for describing the electrical conductor and laminate.

The adhesive layer is formed of a known adhesive.

Examples of the separator include polyethylene terephthalate of which surface has been subjected to a peeling treatment.

For using an electroconductive film, the separator may be peeled off to expose the adhesive layer, and adhered to a pre-determined area.

The electroconductive film of the present invention is preferably used for an anti-static protective film, for example.

"Solid Electrolyte Condenser"

One embodiment of the solid electrolyte condenser of the present invention is described.

In FIG. 1, the configuration of the solid electrolyte condenser of the present invention is diagrammatically shown. The solid electrolyte condenser 10 of this example is a lamination type solid electrolyte condenser provided with a positive electrode (coating film-formed metal) 11, a dielectric layer (dielectric oxidized film) 12 formed on the positive electrode 11, a solid electrolyte layer 13 with a monolayer structure formed on the dielectric layer 12, a graphite layer 14 formed on the solid electrolyte layer 13, and a metal layer 15 formed on the graphite layer 14.

Meanwhile, in the illustrated solid electrolyte condenser 10, a layer of negative electrode is formed of the solid electrolyte layer 13, graphite layer 14, and metal layer 15.

<Positive Electrode>

The positive electrode 11 consists of a porous body of a metal with valve action (valve metal), and it has an electroconducting property. As for the valve metal, a common electrode used for a solid electrolyte condenser can be used, and specific examples thereof include an electrode made of a metallic material like aluminum, tantalum, niobium, and nickel. The metal shape can be metal foil, calcined product of metal, or the like.

<Dielectric Layer>

The dielectric layer 12 is a layer formed by oxidation of a surface of the positive electrode 11. As a method for oxidation, a chemical treatment like positive electrode oxidation can be mentioned.

The dielectric layer 12 formed by oxidation of a surface of the positive electrode 11 has, as it is shown in FIG. 1, a fine irregular surface shape reflecting the surface state of the positive electrode 11. The period of those irregularities depends on the type of the positive electrode 11 or the like, but it is generally 200 nm or less. Furthermore, depth of the concave part (fine pore) forming the irregularities particularly depends on the type of the positive electrode 11 or the like, and thus it cannot be uniformly defined. However, when aluminum is used, for example, the depth of the concave part is several tens of nanometers to 1 µm or so.

<Solid Electrolyte Layer>

The solid electrolyte layer 13 is a layer which is formed of the electroconductive composition of the present invention. In particular, as the electroconductive polymer (A) is more sufficiently impregnated in the inside of fine irregularities of the dielectric layer 12 to yield more easily a solid electrolyte condenser having higher electric capacitance exhibition rate, the electroconductive polymer (A) in the electroconductive composition preferably satisfies Condition (a) described before.

<Graphite Layer>

The graphite layer 14 is formed by applying graphite solution on top of the solid electrolyte layer 13, or impregnating, in a graphite solution, the positive electrode 11 in which the dielectric layer 12 and the solid electrolyte layer 13 are formed in order on a surface thereof.

<Metal Layer>

As for a metal layer 15, in addition to a silver layer like adhesive silver, an aluminum electrode, a tantalum electrode, a niobium electrode, a titanium electrode, a zirconium electrode, a magnesium electrode, a hafnium electrode or the like can be mentioned.

<Method for Manufacturing Solid Electrolyte Condenser>

Next, an example of the method for manufacturing a solid electrolyte condenser 10 is described.

A method for manufacturing the solid electrolyte condenser 10 includes applying an electroconductive composition including the electroconductive polymer (A) and the basic compound (B) on the dielectric layer 12 formed on a surface of the positive electrode 11 (applying process), and drying the electroconductive composition applied to form the solid electrolyte layer 13 (drying process).

The process other than the process of forming the solid electrolyte layer 13 is performed by a known technique.

For example, when the solid electrolyte condenser 10 as illustrated in FIG. 1 is manufactured, the porous bodies are formed around the surface layer of a positive electrode 11, such as, aluminum foil, and by etching, the dielectric layer 12 is formed by oxidation of the positive electrode. Subsequently, after forming the solid electrolyte layer 13 on the dielectric layer 12, it is dipped in a graphite solution or the graphite solution is applied on the solid electrolyte layer 13 to form a graphite layer 14 on the solid electrolyte layer 13, and then, a metal layer 15 is formed on the graphite layer 14. It is encased with the metal layer 15 and the positive electrode 11 by connecting an external terminal (not illustrated) to form a solid electrolyte condenser 10.

Herein, a process of forming the solid electrolyte layer 13 will be described in detail.

The solid electrolyte layer 13 may be formed by applying the electroconductive composition of the present invention on the dielectric layer 12 formed on the surface of the positive electrode 11 (applying process), impregnating the electroconductive polymer (A) or the like in the inside of fine irregularities of the dielectric layer 12, and then drying it (drying process).

The solid electrolyte layer 13 which is formed as above is sufficiently impregnated with the electroconductive polymer (A), that is, even in the inside of fine irregularities of the dielectric layer 12, and thus the electric capacitance exhibition rate of the solid electrolyte condenser 10 is enhanced.

Meanwhile, as described herein, "the applying" refers to the formation of coating film (layer), and the coating and dipping are also included in the applying.

When the electroconductive composition is used for forming the solid electrolyte layer 13, content of the electroconductive polymer (A) in 100% by mass of the electroconductive composition is preferably 9% by mass or less, and more preferably 5% by mass or less. When the content of the electroconductive polymer is 9% by mass or less, the wettability to the positive electrode 11 having the dielectric layer 12 formed thereon or a separator included in the wound-type solid electrolyte condenser, which is described below, is improved, and thus, the electroconductive polymer (A) can be sufficiently impregnated in the inside of fine irregularities without being deposited on the surface of the dielectric layer 12.

The lower limit of the content of the electroconductive polymer is not particularly limited, but it is preferably 0.1% by mass or more from the viewpoint of easily forming the solid electrolyte layer 13 having a desired thickness.

Furthermore, when the electroconductive composition contains, as another component, a surfactant, the content of the surfactant in 100% by mass of the electroconductive composition is preferably 0.1 to 20% by mass, and more preferably 0.1 to 5% by mass. When the content of a surfactant is 0.1% by mass or more, surface tension of the electroconductive composition can be lowered. Accordingly, the impregnation property to the inside of fine irregularities of the dielectric layer 12 is further improved, and the conductivity of the solid electrolyte layer 13 is further increased. Meanwhile, when the content of a surfactant is 20% by mass or less, the electroconducting property can be maintained at good level.

A method of applying the electroconductive composition may be a dip-coating method, a brush painting, a spin coating method, a casting method, a micro gravure coating method, a gravure coating method, a bar-coating method, a roll coating method, a wire-bar-coating method, a spray coating method, a flow-coating method, a screen printing method, a flexo printing method, an offset printing method, an ink jet printing method, and the like. From the viewpoint of an easy handling, a dip-coating method (impregnation method) is preferable, in particular.

When the electroconductive composition is applied according to a dip-coating method, a dipping time in the electroconductive composition may be preferably 1 to 30 minutes from the viewpoint of workability.

In addition, at the time of performing the dip-coating, the dipping is performed under a reduced pressure, and then, the lowered pressure can be increased to normal pressure, or it is also possible to use a method of pressurizing at the time of performing the dipping.

However, for a spray coating method, it is possible to impregnate the electroconductive polymer (A) in the inside of fine irregularities of the dielectric layer 12 by external physical force, but it is more likely to involve high initial investment for mechanical equipment or to have scattering of the electroconductive composition away in a region other than the dielectric layer 12, and thus use ratio of the electroconductive polymer (A) may be easily lowered.

However, according to the present invention, since the applying is performed using the electroconductive composition, the handling is easy even though the spray coating method is not used, and also, the dip-coating method that can use the electroconductive polymer (A) without waste may be used. Therefore, the invention is also advantageous from the economic point of view.

As a method of drying the electroconductive composition after being applied, heat-drying performed by a heating treatment may be preferably used, but for example, an air-drying method or a physical-drying method by spinning may be also preferably used. In particular, for a case in which the electroconductive composition contains the basic compound (C) described above, heat drying is preferable.

In addition, a drying condition is determined according to a type of the electroconductive polymer (A) or a solvent. However, generally, in terms of a drying property, the drying temperature may be preferably 30 to 200° C., and a drying time may be preferably 1 to 60 minutes.

<Working Effect>

The solid electrolyte condenser of the present invention described above has a solid electrolyte layer, which is formed of the electroconductive composition of the present invention, formed on top of a dielectric layer, and thus the electroconductive polymer (A) is sufficiently impregnated even in the inside of fine irregularities of a dielectric layer. Accordingly, a solid electrolyte layer is formed even in the inside of fine irregularities of the dielectric layer 12, and thus the solid electrolyte condenser of the present invention has high electric capacitance exhibition rate. Furthermore, as the solid electrolyte condenser of the present invention also has good durability against heating, an increase in ESR (equivalent series resistance) of a condenser caused by heating can be suppressed.

Furthermore, according to the solid electrolyte condenser of the present invention, it is unlikely for the solid electrolyte layer 13 to be physically deteriorated by heating, and the acidic group of the electroconductive polymer (A) is not easily dissociated. As such, it is believed that the electroconducting property is maintained at good level so that the electric capacitance is not easily lowered.

Furthermore, the solid electrolyte condenser of the present invention can be produced, as described above, by forming a solid electrolyte layer according to applying of the electroconductive composition of the present invention on top of a dielectric layer which has been formed on top of a positive electrode. Accordingly, it is possible that the electroconductive polymer (A) is sufficiently impregnated even in the inside of fine irregularities of a dielectric layer. Thus, according to the present invention, a solid electrolyte layer with high conductivity can be formed on top of a dielectric layer, and thus a solid electrolyte condenser having high electric capacitance exhibition rate and good durability can be easily provided.

Other Embodiments

The solid electrolyte condenser of the present invention is not limited to the embodiments that are described above.

Although the solid electrolyte layer of the aforementioned solid electrolyte condenser has a monolayer structure, the solid electrolyte layer may also have a multilayer structure. However, at least one solid electrolyte layer is a layer which is formed of the electroconductive composition of the present invention. It is also preferable that, among plural solid electrolyte layers, at least the layer in contact with a dielectric layer is a layer which is formed of the electroconductive composition of the present invention.

Furthermore, the aforementioned solid electrolyte condenser is a lamination type solid electrolyte condenser, and for the solid electrolyte condenser of the present invention, for example, a separator can be provided between a positive electrode having a dielectric layer formed thereon and a graphite layer and metal (negative electrode). An example of a solid electrolyte condenser with a separator provided between the positive electrode and negative electrode is wound-type solid electrolyte condenser 20 such as shown in FIG. 2.

Figure 2:
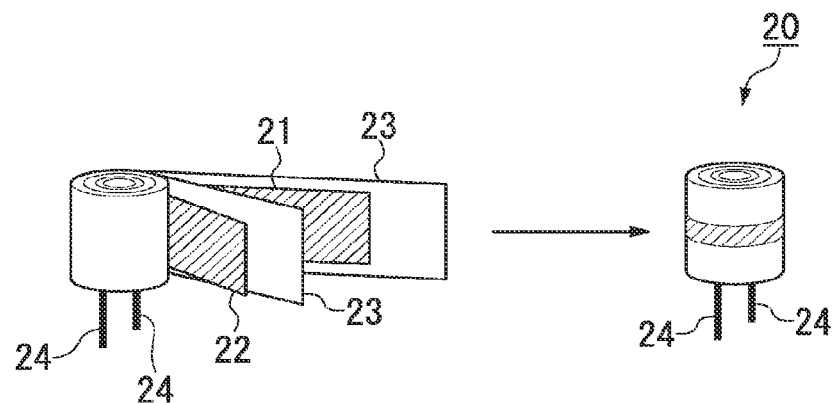
FIG. 2 is a perspective view schematically illustrating other example of the solid electrolyte condenser of the present invention.

Meanwhile, in FIG. 2, reference number 21 indicates a "positive electrode", reference number 22 indicates a "negative electrode", and reference number 23 indicates a "separator."

Wound-type solid electrolyte condenser 20 is obtained by the following procedure: a separator 23 is formed between the positive electrode 21 and the negative electrode 22, which are wound to make a wound product, then a solid electrolyte layer (omitted in the drawing) is formed, in the same manner as the aforementioned lamination type solid electrolyte condenser, on the dielectric layer which has been formed on top of the positive electrode, external terminals 24 are connected to the positive electrode 21 and the negative electrode 22, and encasing is provided. When an electroconductive composition is applied on the dielectric layer, a dip-coating method is preferable.

In addition, after the separator 23 is provided between the positive electrode 21 and the negative electrode 22, it is also possible to form a solid electrolyte layer, in the same manner as the aforementioned lamination type solid electrolyte condenser, on the dielectric layer which has been formed on top of the positive electrode followed by winding to provide a wound product.

As for the material for the separator 23 used in wound-type solid electrolyte condenser 20, fiber, paper, polyethylene terephthalate or the like can be mentioned.

Alternatively, a separator in which insulation oil is impregnated or the like may also be used as the separator 23. Examples of such insulating oils are electrical insulating oils and their mixtures; for example, mineral oil, diallylethane oil or alkyl benzene oil, aliphatic ester oil (such as maleic ester and fumarate ester), aromatic ester oil (such as phthalate ester), polycyclic aromatic oil, silicone oil or the like.

EXAMPLES

In the following, the present invention is described specifically with reference to examples. However, the present invention is not limited to such examples.

"Test 1"

Production Example

Electroconductive Polymer (A): poly(2-methoxyaniline-5-sulfonic Acid)

100 mmol of 2-methoxyaniline-5-sulfonic acid was stirred and dissolved in 4 mol/L aqueous solution of triethylamine at 25° C., and 100 mmol aqueous solution of ammonium peroxodisulfate was added dropwise thereto.

When the dropwise addition is completed, they were stirred additionally for 12 hours at 25° C., and the reaction product was separated by filtering, washed and dried to obtain 15 g of polymer powder (poly(2-methoxyaniline-5-sulfonic acid)).

10 Parts by mass of the obtained powder was dissolved in 100 parts by mass of water, and after cation exchange using cation exchange resin ("AMBERLITE IR-120B", manufactured by Organo Corporation), poly(2-methoxyaniline-5-sulfonic acid) aqueous solution (a-1) was obtained.

Examples 1-1 to 1-19 and Comparative Examples 1-1 to 1-4

Each component was admixed to have the blending composition shown in Table 1, and thus an electroconductive composition was produced. By using a wire bar No. 5, the obtained electroconductive composition was applied on a polyethylene terephthalate (PET) film as a substrate for evaluation such that the film thickness after drying is 100 nm or so to form a coating film. It was then dried on a hot plate at heating conditions shown in Table 1 to obtain a laminate having an electrical conductor laminated on a PET film. Meanwhile, the blending amount of each component shown in Table 1 indicates the amount (g) in terms of solid matter.

The obtained laminate was evaluated in terms of the electroconducting property, water resistance, and moisture resistance according to the methods described below. The results are shown in Table 2.

(Evaluation of Electroconducting Property)

Surface resistance value on the electrical conductor side of a laminate was measured by two-terminal method (distance between electrodes; 20 mm, temperature: 25° C., humidity: 50%).

(Evaluation of Water Resistance)

The electrical conductor side of a laminate was wiped with a cloth which has been soaked in pure water, and the peeling state of the electrical conductor was observed with a naked eye. The evaluation of water resistance was performed according to the following evaluation criteria.

◯: The electrical conductor was not peeled.

Δ: The electrical conductor was partially peeled, and the cloth was observed with coloration originating from electoconductive polymer.

x: The electrical conductor was completely peeled.

(Evaluation of Moisture Resistance)

The laminate was allowed to stand for 48 hours in an environment with temperature 60° C. and humidity 95% to perform the moisture resistance test. In the same manner as the evaluation of electroconducting property, the laminate surface resistance value was measured after the moisture resistance test, and the evaluation of moisture resistance was performed according to the following evaluation criteria.

⊚: Surface resistance value after moisture resistance test is $8.0 \times 10^8$ Ω/sq. or less.

◯: Surface resistance value after moisture resistance test is more than $8.0 \times 10^8$ Ω/sq. but $5.0 \times 10^9$ Ω/sq. or less.

x: Surface resistance value after moisture resistance test is more than $5.0 \times 10^9$ Ω/sq.

TABLE 1

| Example Comparative Example | Component (A) (a-1) | Component (B) Type | Component (B) Amount | Component (D) Type | Component (D) Amount | Component (E) Type | Component (E) Amount | Other additives | Substrate for evaluation | Heating condition |
|---|---|---|---|---|---|---|---|---|---|---|
| Example 1-1 | 1.0 | b-1 | 0.1 | d-1 | 9 | Water/MeOH | 490/500 | — | PET film | 100° C. × 1 min |
| Example 1-2 | 1.0 | b-1 | 0.2 | d-1 | 9 | Water/MeOH | 590/400 | — | PET film | 100° C. × 1 min |
| Example 1-3 | 1.0 | b-1 | 0.2 | d-1 | 9 | Water/MeOH | 390/600 | f-1 1.0 g | PET film | 100° C. × 1 min |
| Example 1-4 | 1.5 | b-1 | 0.3 | d-2 | 8.5 | Water/MeOH | 290/700 | — | PET film | 100° C. × 1 min |
| Example 1-5 | 1.0 | b-1 | 0.3 | d-1 | 9 | Water | 990 | f-2 0.1 g | PET film | 100° C. × 1 min |
| Example 1-6 | 1.0 | b-2 | 0.1 | d-1 | 9 | Water/MeOH | 490/500 | — | PET film | 100° C. × 1 min |
| Example 1-7 | 2.0 | b-2 | 0.3 | d-1 | 8 | Water/EtOH | 490/500 | — | PET film | 100° C. × 1 min |
| Example 1-8 | 1.0 | b-2 | 0.4 | d-2 | 9 | Water/IPA | 590/400 | — | PET film | 100° C. × 1 min |
| Example 1-9 | 1.0 | b-2 | 0.3 | d-2 | 9 | Water/IPA | 590/400 | f-1 1.0 g | PET film | 100° C. × 1 min |
| Example 1-10 | 1.0 | b-2 | 0.3 | d-2 | 9 | Water/IPA | 590/400 | f-2 0.1 g | PET film | 100° C. × 1 min |
| Example 1-11 | 1.0 | b-1 | 0.2 | d-3 | 9 | Water/IPA | 490/500 | f-1 1.0 g | PET film | 100° C. × 1 min |
| Example 1-12 | 1.0 | b-2 | 0.3 | d-4 | 9 | Water/MeOH | 490/500 | f-1 1.0 g | PET film | 100° C. × 1 min |
| Example 1-13 | 1.0 | b-4 | 0.3 | d-2 | 9 | Water/IPA | 590/400 | — | PET film | 130° C. × 1 min |
| Example 1-14 | 1.0 | b-5 | 0.6 | d-1 | 9 | Water/MeOH | 490/500 | — | PET film | 130° C. × 1 min |
| Example 1-15 | 1.0 | b-5 | 0.5 | d-1 | 9 | Water/EtOH | 490/500 | — | PET film | 130° C. × 1 min |

TABLE 1-continued

| Example Comparative Example | Component (A) (a-1) | Component (B) Type | Amount | Component (D) Type | Amount | Component (E) Type | Amount | Other additives | Substrate for evaluation | Heating condition |
|---|---|---|---|---|---|---|---|---|---|---|
| Example 1-16 | 1.0 | b-1 b-5 | 0.13 0.61 | d-1 | 9 | Water/IPA | 490/500 | — | PET film | 130° C. × 1 min |
| Example 1-17 | 1.0 | b-5 | 0.4 | d-1 | 9 | Water/EtOH | 490/500 | — | PET film | 100° C. × 1 min |
| Example 1-18 | 2.0 | b-5 | 0.3 | d-3 | 8 | Water/IPA | 490/500 | — | PET film | 100° C. × 1 min |
| Example 1-19 | 1.0 | b-5 | 0.8 | d-1 | 9 | Water/EtOH | 490/500 | — | PET film | 100° C. × 1 min |
| Comparative Example 1-1 | 1.0 | — | — | d-1 | 9 | Water/MeOH | 490/500 | — | PET film | 100° C. × 1 min |
| Comparative Example 1-2 | 1.0 | — | — | d-2 | 9 | Water | 990 | — | PET film | 100° C. × 1 min |
| Comparative Example 1-3 | 1.0 | — | — | d-1 | 9 | Water/MeOH | 490/500 | — | PET film | 160° C. × 5 min |
| Comparative Example 1-4 | 1.0 | b-3 | 0.20 | d-1 | 9 | Water/MeOH | 490/500 | — | PET film | 100° C. × 1 min |

Abbreviations described in Table 1 are as described below. Meanwhile, the following b-3 corresponds to the basic compound (C).

(Basic Compound (B) and Substitutes)
b-1: 4-aminopyridine
b-2: 4-dimethylaminopyridine
b-3: pyridine
b-4: 2,4,6-triaminopyrimidine
b-5: 2,4,6-triamino-1,3,5-triazone (melamine)

(Water Soluble or Water Dispersible Polymer (D))
d-1: water dispersion type polyester resin (manufactured by The Nippon Synthetic Chemical Industry Co., Ltd.: polyester WR905)
d-2: aqueous urethane emulsion (manufactured by DKS Co. Ltd.: ERASTRON)
d-3: polyvinyl butyral (manufactured by Sekisui Chemical Company, Limited: S-LEC KX5)
d-4: polyvinyl alcohol (manufactured by KURARAY CO., LTD: POVAL)

(Other Components)
f-1: DURANATE (manufactured by Asahi Kasei Chemicals Corporation: block isocyanate)
f-2: PELEX (manufactured by Kao Corporation: anionic surfactant)

TABLE 2

| Example Comparative Example | Surface resistance value [Ω/sq.] | Water resistance | Moisture resistance |
|---|---|---|---|
| Example 1-1 | 8.00E+07 | ○ | ○ |
| Example 1-2 | 8.00E+07 | ○ | ◎ |
| Example 1-3 | 8.00E+07 | ○ | ◎ |
| Example 1-4 | 2.00E+08 | ○ | ◎ |
| Example 1-5 | 2.00E+08 | ○ | ◎ |
| Example 1-6 | 7.00E+07 | ○ | ○ |
| Example 1-7 | 1.00E+07 | ○ | ○ |
| Example 1-8 | 8.00E+07 | ○ | ◎ |
| Example 1-9 | 9.00E+07 | ○ | ◎ |
| Example 1-10 | 8.00E+07 | ○ | ◎ |
| Example 1-11 | 2.00E+08 | ○ | ◎ |
| Example 1-12 | 2.00E+08 | ○ | ◎ |
| Example 1-13 | 8.00E+07 | ○ | ◎ |
| Example 1-14 | 3.00E+08 | ○ | ◎ |
| Example 1-15 | 2.00E+08 | ○ | ◎ |
| Example 1-16 | 4.00E+08 | ○ | ◎ |
| Example 1-17 | 1.00E+08 | ○ | ◎ |
| Example 1-18 | 7.00E+07 | ○ | ○ |
| Example 1-19 | 7.00E+08 | ○ | ◎ |
| Comparative Example 1-1 | 8.00E+07 | X | X |
| Comparative Example 1-2 | 8.00E+07 | X | X |
| Comparative Example 1-3 | 1.00E+12 | X | X |
| Comparative Example 1-4 | 8.00E+07 | X | X |

As it is clearly shown in Table 2, the electroconductive composition of each example has a high electroconducting property, and also it can form an electrical conductor with high water resistance.

Meanwhile, the electrical conductor obtained from the electroconductive composition of Comparative examples 1-1 to 1-3, which does not contain the specific basic compound (B), exhibited poor water resistance.

Furthermore, according to Comparative example 1-3 in which the specific basic compound (B) is not contained but the electrical conductor was heated at high temperature of 160° C., the electroconducting property was also poor. In this regard, it is believed that, as the sulfonic acid group of the electroconductive polymer (A) is dissociated according to heating, the electroconducting property is deteriorated.

Furthermore, according to Comparative example 1-4 in which pyridine is contained as the specific basic compound (C) instead of the specific basic compound (B) exhibited poor water resistance.

"Test 2"

Production Example

Electroconductive Polymer (A): poly(2-methoxyaniline-5-sulfonic Acid)

Poly(2-methoxyaniline-5-sulfonic acid) aqueous solution (a-1) was obtained in the same manner as the production example of Test 1.

Examples 2-1 to 2-18 and Comparative Examples 2-1 to 2-4

Each component was admixed to have the blending composition shown in Table 3, and thus an electroconductive composition was produced.

By using a wire bar No. 5, the obtained electroconductive composition was applied on a substrate for evaluation listed in Table 3 such that the film thickness after drying has a value shown in Table 3 to form a coating film. It was then dried on a hot plate at heating conditions shown in Table 3 to obtain a laminate having an electrical conductor laminated on a PET film. Meanwhile, the blending amount of each component shown in Table 3 indicates the amount (g) in terms of solid matter.

The obtained electroconductive composition was evaluated according to the following method in terms of stability, and the results are shown in Table 4.

The obtained laminate was evaluated in terms of the electroconducting property, water resistance, and moisture resistance according to the methods described below. The results are shown in Table 4.

(Evaluation of Stability)

The electroconductive composition was allowed to stand at room temperature. After a week, an occurrence of precipitates or aggregates was determined with a naked eye.
○: Occurrence of slight aggregates.
Δ: Occurrence of aggregates.
x: Occurrence of precipitates.

(Evaluation 1 of Electroconducting Property)

The surface resistance value was measured in the same manner as the evaluation of electroconducting property of Test 1. The result was used as an initial surface resistance value.

(Evaluation 2 of Electroconducting Property)

The laminate was allowed to stand for 1 week in an environment with temperature 25° C. and humidity 50%. The laminate surface resistance value after keeping was measured in the same manner as the evaluation of electroconducting property of Test 1. The result was used as a surface resistance value after keeping. The evaluation of electroconducting property was performed according to the following evaluation criteria. When it is evaluated as "0", it means that the electroconducting property is stabilized as it is hardly affected by humidity even when it was left to stand for 1 week in an environment with temperature 25° C. and humidity 50%.
○: Surface resistance value after keeping is at most 10 times the initial surface resistance value.
x: Surface resistance value after keeping is more than 10 times the initial surface resistance value.

(Evaluation 3 of Electroconducting Property)

The laminate was immersed for 10 minutes in water at temperature 25° C. After drying, it was subjected to a water resistance test. The laminate surface resistance value was measured in the same manner as the evaluation of electroconducting property of Test 1. The result was used as a surface resistance value after water resistance test. The evaluation of electroconducting property was performed according to the following evaluation criteria. When it is evaluated as "0", it means that the electrical conductor has excellent water resistance.
○: Surface resistance value after water resistance test is at most 10 times the initial surface resistance value.
x: Surface resistance value after water resistance test is more than 10 times the initial surface resistance value.

(Evaluation of Water Resistance)

Water resistance was evaluated in the same manner as the water resistance evaluation of Test 1.

(Evaluation of Moisture Resistance)

Moisture resistance test was evaluated in the same manner as the moisture resistance evaluation of Test 1, and the water resistance was evaluated.

TABLE 3

| Example Comparative Example | Component (A) (a-1) | Component (B) Type | Component (B) Amount | Component (C) Type | Component (C) Amount | Component (D) Type | Component (D) Amount | Component (E) Type | Component (E) Amount |
|---|---|---|---|---|---|---|---|---|---|
| Example 2-1 | 10.0 | b-6 | 1.0 | c-1 | 0.4 | — | — | Water/MeOH | 490/500 |
| Example 2-2 | 10.0 | b-6 | 2.0 | c-1 | 0.5 | — | — | Water/IPA | 790/200 |
| Example 2-3 | 10.0 | b-6 | 3.0 | c-1 | 0.1 | — | — | Water | 990 |
| Example 2-4 | 10.0 | b-6 | 4.0 | c-4 | 0.2 | — | — | Water/MeOH | 490/500 |
| Example 2-5 | 10.0 | b-7 | 1.0 | c-2 | 0.3 | — | — | Water/MeOH | 490/500 |
| Example 2-6 | 10.0 | b-7 | 1.5 | c-3 | 3 | — | — | Water/MeOH | 490/500 |
| Example 2-7 | 10.0 | b-8 | 2.0 | c-1 | 0.4 | — | — | Water/EtOH | 490/500 |
| Example 2-8 | 10.0 | b-8 | 3.0 | c-1 | 0.5 | — | — | Water/MeOH | 490/500 |
| Example 2-9 | 10.0 | b-8 | 4.0 | c-1 | 0.6 | — | — | Water/MeOH | 790/200 |
| Example 2-10 | 1.0 | b-8 | 0.3 | c-1 | 0.03 | d-1 | 9 | Water/MeOH | 490/500 |
| Example 2-11 | 1.0 | b-8 | 0.3 | c-1 | 0.05 | d-2 | 9 | Water/MeOH | 490/500 |
| Example 2-12 | 1.0 | b-8 | 0.3 | c-1 | 0.05 | d-3 | 9 | Water/EtOH | 200/790 |
| Example 2-13 | 1.0 | b-8 | 0.3 | c-1 | 0.04 | d-4 | 9 | Water/IPA | 490/500 |
| Example 2-14 | 1.5 | b-8 | 0.4 | — | — | d-1 | 8.1 | Water/EtOH | 390/600 |
| Example 2-15 | 1.5 | b-8 | 0.3 | — | — | d-1 | 7.1 | Water/EtOH | 390/600 |
| Example 2-16 | 1.5 | b-8 | 0.4 | — | — | d-1 | 7.1 | Water/EtOH | 390/600 |
| Example 2-17 | 1.5 | b-8 | 0.4 | — | — | d-1 | 7.1 | Water/EtOH | 390/600 |
| Example 2-18 | 10.0 | b-9 | 1.0 | c-1 | 0.4 | — | — | Water/MeOH | 490/500 |
| Comparative Example 2-1 | 10.0 | — | — | c-1 / c-5 | 0.5 / 3.0 | — | — | Water/MeOH | 490/500 |
| Comparative Example 2-2 | 10.0 | — | — | c-5 | 3.0 | — | — | Water/MeOH | 490/500 |
| Comparative Example 2-3 | 1.0 | — | — | c-5 | 0.3 | d-2 | 9 | Water/MeOH | 490/500 |
| Comparative Example 2-4 | a-2 10.0 | — | — | — | — | d-4 | 9 | Water/MeOH | 490/500 |

TABLE 3-continued

| Example Comparative Example | Other additives | Substrate for evaluation | Heating condition | Film thickness [nm] |
|---|---|---|---|---|
| Example 2-1 | — | Glass plate | 100° C. × 1 min | 100 |
| Example 2-2 | — | Glass plate | 100° C. × 1 min | 80 |
| Example 2-3 | f-2 1.0 g | Glass plate | 100° C. × 1 min | 80 |
| Example 2-4 | — | Glass plate | 100° C. × 1 min | 80 |
| Example 2-5 | — | Glass plate | 100° C. × 1 min | 50 |
| Example 2-6 | — | Glass plate | 100° C. × 1 min | 30 |
| Example 2-7 | — | Glass plate | 100° C. × 1 min | 100 |
| Example 2-8 | — | Glass plate | 100° C. × 1 min | 100 |
| Example 2-9 | — | Glass plate | 100° C. × 1 min | 100 |
| Example 2-10 | — | PET film | 130° C. × 1 min | 100 |
| Example 2-11 | — | PET film | 130° C. × 1 min | 50 |
| Example 2-12 | — | PET film | 130° C. × 1 min | 30 |
| Example 2-13 | — | PET film | 100° C. × 1 min | 20 |
| Example 2-14 | — | PET film | 130° C. × 1 min | 100 |
| Example 2-15 | f-1 1.0 g | PET film | 130° C. × 1 min | 50 |
| Example 2-16 | f-3 1.0 g | PET film | 130° C. × 1 min | 30 |
| Example 2-17 | f-3 1.0 g f-4 0.2 g | PET film | 130° C. × 1 min | 30 |
| Example 2-18 | — | Glass plate | 100° C. × 1 min | 100 |
| Comparative Example 2-1 | — | Glass plate | 100° C. × 1 min | 100 |
| Comparative Example 2-2 | — | Glass plate | 100° C. × 1 min | 100 |
| Comparative Example 2-3 | — | PET film | 130° C. × 1 min | 15 |
| Comparative Example 2-4 | — | Glass plate | 130° C. × 1 min | 10 |

Abbreviations described in Table 3 are as described below.
(Substitute for the Electroconductive Polymer (A))
a-2: PEDOT (poly(3,4-ethylenedioxythiphene)) dispersion (manufactured by Clevios: CLEVIOUS-P)
(Basic Compound (B))
b-6: bipyridyl (pyridine pka=5.18)
b-7: diaminoethane (pka=9.96)
b-8: polyvinylpyridine (average molecular weight of 160,000, pka=4.9)
b-9: polyarylamine (pka=9.9)
(Basic Compound (C))
c-1: ammonia (pka=9.245, boiling point of −33.3° C.)
c-2: 2-picoline (pka=6.20, boiling point of 128° C.)
c-3: triethylamine (pka=10.87, boiling point of 89.7° C.)
c-4: decylamine (pka=10.64, boiling point of 217° C.)
c-5: pyridine (pka=5.18, boiling point of 115° C.)

(Water Soluble or Water Dispersible Polymer (D))
d-1: water dispersion type polyester resin (manufactured by The Nippon Synthetic Chemical Industry Co., Ltd.: polyester WR905)
d-2: aqueous urethane emulsion (manufactured by DKS Co. Ltd.: ERASTRON)
d-3: polyvinyl butyral (manufactured by Sekisui Chemical Company, Limited: S-LEC KX5)
d-4: polyvinyl alcohol (manufactured by KURARAY CO., LTD: POVAL)
(Other Components)
f-1: DURANATE (manufactured by Asahi Kasei Chemicals Corporation: block isocyanate)
f-2: PELEX (manufactured by Kao Corporation: anionic surfactant)
f-3: AQUACER (manufactured by BYK: lubrication improving agent)
f-4: 4-aminopyridine (manufactured by Tokyo Chemical Industry Co., Ltd.)

TABLE 4

| Example Comparative Example | Stability | Conducting property 1 Initial surface resistance value [Ω/sq.] | Conducting property 2 Surface resistance value after keeping [Ω/sq.] | Evaluation | Conducting property 3 Surface resistance value after water resistance test [Ω/sq.] | Evaluation | Water resistance | Moisture resistance |
|---|---|---|---|---|---|---|---|---|
| Example 2-1 | ○ | 4.00E+05 | 4.00E+05 | ○ | 8.00E+05 | ○ | ○ | ○ |
| Example 2-2 | ○ | 8.00E+05 | 8.00E+05 | ○ | 3.00E+06 | ○ | ○ | ○ |
| Example 2-3 | Δ | 1.00E+06 | 1.00E+06 | ○ | 9.00E+06 | ○ | ○ | ○ |
| Example 2-4 | ○ | 5.00E+07 | 5.00E+07 | ○ | 4.00E+07 | ○ | Δ | ○ |
| Example 2-5 | Δ | 7.00E+06 | 9.00E+06 | ○ | 5.00E+06 | ○ | ○ | ○ |
| Example 2-6 | Δ | 5.00E+07 | 5.00E+07 | ○ | 4.00E+06 | ○ | ○ | ○ |
| Example 2-7 | ○ | 5.00E+05 | 5.00E+05 | ○ | 9.00E+05 | ○ | ○ | ○ |
| Example 2-8 | ○ | 7.00E+05 | 7.00E+05 | ○ | 2.00E+06 | ○ | ○ | ○ |
| Example 2-9 | ○ | 9.00E+05 | 9.00E+05 | ○ | 1.00E+06 | ○ | ○ | ○ |
| Example 2-10 | ○ | 1.00E+07 | 1.00E+07 | ○ | 2.00E+07 | ○ | ○ | ○ |
| Example 2-11 | ○ | 3.00E+07 | 3.00E+07 | ○ | 5.00E+07 | ○ | ○ | ○ |
| Example 2-12 | ○ | 5.00E+07 | 5.00E+07 | ○ | 7.00E+07 | ○ | ○ | ○ |
| Example 2-13 | ○ | 8.00E+07 | 8.00E+07 | ○ | 1.00E+08 | ○ | ○ | ○ |

TABLE 4-continued

| Example Comparative Example | Stability | Conducting property 1 Initial surface resistance value [Ω/sq.] | Conducting property 2 Surface resistance value after keeping [Ω/sq.] | Evaluation | Conducting property 3 Surface resistance value after water resistance test [Ω/sq.] | Evaluation | Water resistance | Moisture resistance |
|---|---|---|---|---|---|---|---|---|
| Example 2-14 | ○ | 1.00E+07 | 1.00E+07 | ○ | 3.00E+07 | ○ | ○ | ○ |
| Example 2-15 | ○ | 3.00E+07 | 3.00E+07 | ○ | 4.00E+07 | ○ | ○ | ○ |
| Example 2-16 | ○ | 5.00E+07 | 5.00E+07 | ○ | 6.00E+07 | ○ | ○ | ○ |
| Example 2-17 | ○ | 5.00E+07 | 5.00E+07 | ○ | 6.00E+07 | ○ | ○ | ○ |
| Example 2-18 | ○ | 9.00E+06 | 3.00E+07 | ○ | 4.00E+07 | ○ | ○ | ○ |
| Comparative Example 2-1 | ○ | 7.00E+05 | 7.00E+07 | X | cannot be determined | | X | X |
| Comparative Example 2-2 | ○ | 4.00E+05 | 5.00E+06 | X | cannot be determined | | X | X |
| Comparative Example 2-3 | ○ | 2.00E+07 | 2.00E+09 | X | 4.00E+11 | X | X | X |
| Comparative Example 2-4 | Δ | 2.00E+07 | 2.00E+11 | X | 4.00E+11 | X | X | X |

As it is clearly shown in Table 4, the electroconductive composition of each example has a high electroconducting property, and also it can form an electrical conductor with high water resistance.

"Test 3"

<Method for Measurement•Evaluation>

(Measurement of Volume Average Particle Diameter)

The volume average particle diameter of an electroconductive polymer was obtained as follows.

First, an electroconductive composition having 1% by mass of electroconductive polymer concentration was prepared using ultrapure water as a solvent, and the particle distribution was measured by a dynamic light scattering method using a dynamic light scattering particle diameter-measuring device (manufactured by Nikkiso Co., Ltd., "NANOTRAC UPA-UT") and was calibrated with the viscosity of ultrapure water.

Herein, when there were one or more obtained peaks, the volume average particle diameter of the minimum particle distribution including the peak that has the minimum particle diameter was obtained, and then, it was defined as the volume average particle diameter of the electroconductive polymer.

Meanwhile, when the particle distribution measured by a dynamic light scattering method had only one peak, after calibrating the particle distribution with the viscosity of ultrapure water, the volume average particle diameter was obtained by using the particle distribution as it is as the minimum particle distribution.

(Film Crack Test)

0.5 g of the electroconductive composition was added to an aluminum dish, and by heating in a dryer at 160° C. for 30 minutes, a coating film (film thickness of 50 μm) was formed. State of the obtained coating film was determined with a naked eye, and the film crack (deterioration) of the coating film was evaluated according to the following evaluation criteria.

○: There was no occurrence of cracks on the coating film.
x: There was an occurrence of cracks on the coating film.

(Measurement of Initial Electric Capacitance)

Using an LCR meter ("Precision LCR meter E4980A", made by Agilent Technologies), electric capacitance (C1) of the lamination type aluminum solid electrolyte condenser was measured at 120 Hz, and the result was found as initial electric capacitance.

Because the aluminum element used for a lamination type aluminum solid electrolyte condenser has electrical capacitance of 2.8 μF, the electric capacitance exhibition rate of the lamination type aluminum solid electrolyte condenser was obtained based on the following formula (i). When the electric capacitance exhibition rate is 90% or more, it was graded as "○", and when the electric capacitance exhibition rate is less than 90%, it was graded as "x".

$$\text{Electric capacitance exhibition rate (\%)} = (C1/2.8) \times 100 \quad \text{(i)}$$

(Measurement of Electric Capacitance after Heating Treatment)

The lamination type aluminum solid electrolyte condenser was heated for 30 minutes in a dryer at 160° C., and then cooled to room temperature. Using an LCR meter, electric capacitance (C2) of the lamination type aluminum solid electrolyte condenser after cooling was measured at 120 Hz, and the result was found as electric capacitance after heating treatment.

Based on the following formula (ii), a change rate of the electric capacitance of the lamination type aluminum solid electrolyte condenser was obtained. When the change rate is lower than 5%, it was graded as "○", and when the change rate is 5% or more, it was graded as "x".

$$\text{Change rate (\%)} = \{(C1-C2)/C1\} \times 100 \quad \text{(ii)}$$

<Electroconductive Polymer (A)>

(Preparation of Electroconductive Polymer Solution (a-4))

100 mmol of 2-aminoanisole-4-sulfonic acid was stirred and dissolved in water containing 100 mmol of triethylamine at 25° C., and 100 mmol aqueous solution of ammonium peroxodisulfate was added dropwise thereto. When the dropwise addition is completed, they were stirred additionally for 12 hours at 25° C., and the reaction product was separated by filtering, washed and dried to obtain 15 g of poly(2-sulfo-5-methoxy-1,4-iminophenylene) in powder state.

5 Parts by mass of the obtained poly(2-sulfo-5-methoxy-1,4-iminophenylene) were dissolved in 95 parts by mass of water at room temperature to obtain the electroconductive polymer solution (a-3).

The acidic cation exchange resin ("AMBERLITE", manufactured by Organo Corporation) was filled in a column such that it is 50 pats by mass relative to 100 parts by mass of the obtained electroconductive polymer solution (a-3). Then, the electroconductive polymer solution (a-3)

was passed through the column with flow rate of SV=8 to perform the cation exchange treatment. As a result, the purified electroconductive polymer solution (a-4) was obtained.

As described herein, "SV" means space velocity, and SV (1/hr)=Flow speed (m$^3$/hr)/Filter material amount (volume: m$^3$).

As a result of measuring the volume average particle diameter of the electroconductive polymer in the electroconductive polymer solution (a-4), it was found to be 0.95 nm.

<Basic Compound (B)>

As the basic compound (B) and substitutes thereof, the following compounds were used. Meanwhile, the following b-15 and b-16 correspond to the basic compound (C).
b-10: 4-aminopyridine (boiling point: 273° C.)
b-11: 4-dimethylaminopyridine (boiling point: 240° C.)
b-12: 2,6-diaminopyridine (boiling point: 285° C.)
b-13: 1,5-diazabicyclo[4.3.0]-5-nonene (DBN) (boiling point: 220° C.)
b-14: lithium hydroxide (boiling point: 920° C.)
b-15: ammonia water (boiling point: −33° C.)
b-16: pyridine (boiling point: 115° C.)
b-17: polyvinylpyridine Example 3-1

Production of Electroconductive Composition

By mixing the electroconductive polymer solution (a-4) as the electroconductive polymer (A), b-10 as the basic compound (B), and water as the solvent (E) to have the blending composition shown in Table 5, an electroconductive composition was prepared. Meanwhile, the blending amount of the electroconductive polymer (A) and the basic compound (B) shown in Table 5 is expressed in terms of solid content (% by mass).

Content of the basic compound (B) in the obtained electroconductive composition was 0.5 mol relative to 1 mol of the monomer unit of the electroconductive polymer (A).

(Production of Aluminum Element)

By using an aluminum foil with electric capacitance of 2.8 μF per unit area, oxidizing the positive electrode in aqueous solution of ammonium adipic acid at concentration of 3% by mass for 120 minutes at conditions including voltage of 121 V and temperature of 70° C., and forming a dielectric layer on the aluminum foil surface, an aluminum element was obtained.

(Production of Lamination Type Aluminum Solid Electrolyte Condenser)

The above aluminum element was immersed for 5 minutes in the electroconductive composition which has been prepared before. After removing the aluminum element, it was dried by heating for 30 minutes at 120° C. to form a solid electrolyte layer on a dielectric layer (thickness from the dielectric layer surface was 10 or so).

Subsequently, a graphite layer and an aluminum electrode were formed on top of the solid electrolyte layer, and a negative electrode lead terminal was connected to the aluminum electrode to produce a lamination type aluminum solid electrolyte condenser.

By using the obtained lamination type aluminum solid electrolyte condenser, a film crack test was performed, and the initial electric capacitance and the capacitance after heating treatment were measured. The results are shown in Table 6.

Examples 3-2 to 3-4 and Comparative Examples 3-1 to 3-4

The electroconductive composition was prepared in the same manner as Example 3-1 except that the type and blending amount of the basic compound (B) are modified to those described in Table 5, and then a lamination type aluminum solid electrolyte condenser was produced.

By using the obtained lamination type aluminum solid electrolyte condenser, a film crack test was performed, and the initial electric capacitance and the capacitance after heating treatment were measured. The results are shown in Table 6.

Comparative Example 3-5

The electroconductive composition was prepared in the same manner as Example 3-1 except that PEDOT (poly(3,4-ethylenedioxythiophene)) dispersion ("PH500" manufactured by Cleovis, volume average particle diameter of PEDOT: 26.7 nm, concentration: 1.2% by mass) is used instead of the electroconductive polymer solution (a-4) and the basic compound (B) is not used, and then a lamination type aluminum solid electrolyte condenser was produced.

By using the obtained lamination type aluminum solid electrolyte condenser, a film crack test was performed, and the initial electric capacitance and the capacitance after heating treatment were measured. The results are shown in Table 6.

TABLE 5

|  | Electroconductive polymer (A) | | | Basic compound (B) | | Solvent (E) |
|---|---|---|---|---|---|---|
|  | Type | Volume average particle diameter [nm] | Blending amount [% by mass] | Type | Blending amount [% by mass] | Water [% by mass] |
| Example 3-1 | a-4 | 0.95 | 3 | b-10 | 0.9 | 96.1 |
| Example 3-2 | a-4 | 0.95 | 3 | b-11 | 0.9 | 96.1 |
| Example 3-3 | a-4 | 0.95 | 3 | b-12 | 0.9 | 96.1 |
| Example 3-4 | a-4 | 0.95 | 3 | b-13 | 0.9 | 96.1 |
| Comparative Example 3-1 | a-4 | 0.95 | 3 | — | — | 97.0 |
| Comparative Example 3-2 | a-4 | 0.95 | 3 | b-14 | 0.3 | 96.7 |
| Comparative Example 3-3 | a-4 | 0.95 | 3 | b-15 | 0.5 | 96.5 |
| Comparative Example 3-4 | a-4 | 0.95 | 3 | b-16 | 0.7 | 96.3 |
| Comparative Example 3-5 | PEDOT dispersion | 26.7 | 1.2 | — | — | 98.8 |

TABLE 6

| | Film crack test | Measurement of initial electric capacitance | | | Measurement of electric capacitance after heating treatment | | |
|---|---|---|---|---|---|---|---|
| | | Electric capacitance (C1) [mF] | Electric capacitance exhibition rate [%] | Evaluation | Electric capacitance (C2) [mF] | Change rate [%] | Evaluation |
| Example 3-1 | ○ | 2.80 | 100 | ○ | 2.70 | 3.6 | ○ |
| Example 3-2 | ○ | 2.90 | 104 | ○ | 2.87 | 1 | ○ |
| Example 3-3 | ○ | 2.80 | 100 | ○ | 2.70 | 3.6 | ○ |
| Example 3-4 | ○ | 2.60 | 93 | ○ | 2.55 | 1.9 | ○ |
| Comparative Example 3-1 | X | 2.80 | 100 | ○ | 2.60 | 7.1 | X |
| Comparative Example 3-2 | X | 2.80 | 100 | ○ | 2.48 | 11.4 | X |
| Comparative Example 3-3 | X | 2.80 | 100 | ○ | 2.60 | 7.1 | X |
| Comparative Example 3-4 | X | 2.80 | 100 | ○ | 2.65 | 5.4 | X |
| Comparative Example 3-5 | X | 2.30 | 82 | X | 2.25 | 2.2 | ○ |

Examples 3-5 to 3-6 and Comparative Examples 3-6 to 3-7

Preparation of Electroconductive Composition

By mixing the electroconductive polymer solution (a-4) as the electroconductive polymer (A), the basic compound (B) of the type shown in Table 7, and the solvent (E) to have the blending composition shown in Table 7, an electroconductive composition was prepared. Meanwhile, as an alcohol, methanol was used. Furthermore, the blending amount of the electroconductive polymer (A) and the basic compound (B) shown in Table 7 is expressed in terms of solid content (% by mass).

Content of the basic compound (B) in the obtained electroconductive composition was 0.5 mol relative to 1 mol of the monomer unit of the electroconductive polymer (A).

(Production of Aluminum Element)

By using an aluminum foil with electric capacitance of 2.8 µF per unit area, oxidizing the positive electrode in aqueous solution of ammonium adipic acid at concentration of 3% by mass for 120 minutes at conditions including voltage of 121 V and temperature of 70° C., and forming a dielectric layer on the aluminum foil surface, an aluminum element was obtained.

(Production of Lamination Type Aluminum Solid Electrolyte Condenser)

The above aluminum element was immersed for 5 minutes in the electroconductive composition which has been prepared before. After removing the aluminum element, it was dried by heating for 20 minutes at 120° C. to form a solid electrolyte layer on a dielectric layer (thickness from the dielectric layer surface was 10 or so). Next, considering the possibility of having electric field polymerization or cleaning or the like, the aluminum element having a solid electrolyte layer form on dielectric layer was immersed in pure water for 1 minute (cleaned), and then dried by heating for 10 minutes at 120° C.

Subsequently, a graphite layer and an aluminum electrode were formed on top of the solid electrolyte layer, and a negative electrode lead terminal was connected to the aluminum electrode to produce a lamination type aluminum solid electrolyte condenser.

(Measurement of Electric Capacitance after Cleaning)

Using an LCR meter, electric capacitance (C3) of the obtained lamination type aluminum solid electrolyte condenser was measured at 120 Hz, and the result is shown in Table 8.

TABLE 7

| | Electroconductive polymer (A) | | Basic compound (B) | | | | | | Solvent (E) | |
|---|---|---|---|---|---|---|---|---|---|---|
| | Type | Blending amount [% by mass] | Type | Blending amount [% by mass] | Type | Blending amount [% by mass] | Type | Blending amount [% by mass] | Water [% by mass] | Alcohol [% by mass] |
| Example 3-5 | a-4 | 5 | b-17 | 1.0 | b-15 | 0.4 | | | 46.8 | 46.8 |
| Example 3-6 | a-4 | 5 | b-17 | 1.0 | b-15 | 0.3 | b-10 | 0.1 | 46.8 | 46.8 |
| Comparative Example 3-6 | a-4 | 5 | b-14 | 1.0 | | | | | 94 | |
| Comparative Example 3-7 | a-4 | 5 | b-15 | 0.4 | | | | | 95.6 | |

Because the aluminum element used for a lamination type aluminum solid electrolyte condenser has electric capacitance of 2.8 µF, the electric capacitance exhibition rate of the lamination type aluminum solid electrolyte condenser was obtained based on the following formula (iii). When the electric capacitance exhibition rate is 70% or more, it was found to have good water resistance and graded as "○", and when the electric capacitance exhibition rate is less than 70%, it was found to have poor water resistance and graded as "x".

Electric capacitance exhibition rate (%)=$b(C3/2.8)\times 100$    (iii)

TABLE 8

|  | Electric capacitance (C3) [μF] | Electric capacitance exhibition rate (%) | Water resistance |
|---|---|---|---|
| Example 3-5 | 5 | 72 | ○ |
| Example 3-6 | 5 | 76 | ○ |
| Comparative Example 3-6 | 5 | 45 | X |
| Comparative Example 3-7 | 5 | 52 | X |

As it is clearly shown in Tables 6 and 8, the lamination type aluminum solid electrolyte condenser of Examples 3-1 to 3-6 in which a solid electrolyte layer is formed by using an electroconductive composition containing the electroconductive polymer (A) and the basic compound (B) exhibited high electric capacitance exhibition rate, and it is believed to be caused by sufficient impregnation of the electroconductive polymer (A) even in the inside of fine irregularities of the dielectric layer.

Furthermore, the lamination type aluminum solid electrolyte condenser of Examples 3-1 to 3-4 hardly exhibited lower electric capacitance even after the heating treatment, showing little change rate of the electric capacitance. Furthermore, the lamination type aluminum solid electrolyte condenser of Examples 3-5 and 3-6 maintained the high capacitance exhibition rate even when the electrolyte is cleaned with water, showing excellent eater resistance.

In particular, when a basic compound having two or more basic nitrogen atoms is used as the basic compound (B) in Examples 3-1 to 3-4, the initial electric capacitance and also the electric capacitance after the heating treatment were high, exhibiting an excellent effect.

Because the electroconductive composition prepared in Examples 3-1 to 3-6 can form a coating film which hardly exhibits film cracking, it was found that a solid electrolyte layer which does not easily show physical deterioration even by a heating treatment can be formed by the present invention.

Meanwhile, although the lamination type aluminum solid electrolyte condenser of Comparative examples 3-1 to 4 in which the basic compound (B) having two or more basic nitrogen atoms is not used for forming a solid electrolyte layer exhibited high initial electric capacitance, it exhibited a significantly lowered electric capacitance after the heating treatment.

The lamination type aluminum solid electrolyte condenser of Comparative example 3-5 in which a PEDOT dispersion is used instead of the electroconductive polymer (A) having an acidic group for forming a solid electrolyte layer exhibited low electric capacitance exhibition rate, since it was difficult for PEDOT to get impregnated in the inside of fine irregularities of a dielectric layer.

Furthermore, the coating film formed of the electroconductive composition prepared in Comparative example 3-1 to 3-5 easily exhibited film cracking.

Furthermore, the lamination type aluminum solid electrolyte condenser of Comparative examples 3-6 and 3-7 exhibited lower capacitance exhibition rate when the electrolyte is cleaned with water, thus exhibiting poor water resistance.
"Test 4"

According to the following method, the anti-static performance was evaluated for the laminate obtained from Examples 2-10 to 2-13 of Test 2. Furthermore, as a comparative example, the anti-static performance was also evaluated for the PET film before forming an electrical conductor. The results are shown in Table 9.

<Evaluation of Anti-Static Performance>

The laminate or PET film was cut to have a size of 5 cm×5 cm, and charge decay measurement was performed at following conditions with reference to JIS L 1094-1992. From the obtained decay curve, half-life was determined, and the evaluation of anti-static performance was performed according to the following criteria.

(Measurement Condition)
Measurement condition: environment temperature of 20° C.±2° C., environment humidity of 40%±2%
Measurement device: Model HONESTMETER H0110 manufactured by SHISHIDO ELECTROSTATIC, LTD.
Setting of measurement device:
Distance from tip of needle electrode of application part to surface of turntable: 20 mm
Distance from electrode plate of current-receiving part to surface of turntable: 15 mm
Applied voltage: (+)10 kV
Time for voltage application: 30 s
(Evaluation)
○: Half life is 1 sec or less.
x: Half life is more than 1 sec.

TABLE 9

| Laminate or film used | Half life |
|---|---|
| Example 2-10 | ○ |
| Example 2-11 | ○ |
| Example 2-12 | ○ |
| Example 2-13 | ○ |
| PET film | X |

As it is clearly shown in Table 9, the laminate obtained from Examples 2-10 to 2-13 exhibited an excellent anti-static performance.

Meanwhile, as a result of measuring the surface resistance value of the PET film before forming an electrical conductor, the surface resistance value was high, that is, higher than $10^{16}$ Ω/sq. In addition, the anti-static performance was poor, too.

INDUSTRIAL APPLICABILITY

It is expected that the electroconductive composition of the present invention can be used for a broad range of applications as an electroconducting property material like a battery, a condenser electrolyte, a primer for electrolytic polymerization of condenser electrolyte, a chemical sensor, a display element, a non-linear material, an anti-corrosive agent, an adhesive, a fiber, an anti-corrosive paint, an electrodeposition paint, and a plating primer, and also as a magnetic card, a magnetic tape, a magnetic disc, a photography film, a printing material, a releasing film, a heat sealing tape-film, an IC tray, an IC carrier tape, a cover tape, and an anti-static material like a packaging material for electronic components.

EXPLANATIONS OF LETTERS OR NUMERALS

10 SOLID ELECTROLYTE CONDENSER
11 POSITIVE ELECTRODE
12 DIELECTRIC LAYER
13 SOLID ELECTROLYTE LAYER
14 GRAPHITE LAYER
15 METAL LAYER

20 SOLID ELECTROLYTE CONDENSER
21 POSITIVE ELECTRODE
22 NEGATIVE ELECTRODE
23 SEPARATOR
24 EXTERNAL TERMINAL

The invention claimed is:

1. An electroconductive composition comprising:
an electroconductive polymer (A) comprising a sulfonic acid group and/or a carboxylic acid group, and
a basic compound (B) having two or more nitrogen atoms selected from nitrogen-containing heterocyclic compounds substituted with a primary, secondary, or tertiary amino group, and compounds having two or more nitrogen-containing heterocycles, provided said basic compound (B) is not a triaminotriazine.

2. The electroconductive composition according to claim 1, wherein the basic compound (B) has two or more nitrogen-containing heterocycles.

3. The electroconductive composition according to claim 1, further comprising a basic compound (C) having one nitrogen atom.

4. An electroconductive composition comprising:
an electroconductive polymer (A) comprising a sulfonic acid group and/or a carboxylic acid group,
a basic compound (B) having two or more nitrogen acorns, and
a basic compound (C) having one nitrogen atom,
wherein a boiling point of the basic compound (C) is lower than a boiling point of the basic compound (B).

5. The electroconductive composition according to claim 3, wherein a base dissociation constant (pKb) of the basic compound (C) at 25° C. is lower than a base dissociation constant (pKb) of the basic compound (B) at 25° C.

6. The electroconductive composition according to claim 1, further comprising a water soluble or water dispersible polymer (D), which is different from the electroconductive polymer (A).

7. The electroconductive composition according to claim 1, wherein a base dissociation constant (pKb) of the basic compound (B) at 25° C. is 4.5 or more.

8. The electroconductive composition according to claim 1, wherein the basic compound (B) has a conjugated structure.

9. The electroconductive composition according to claim 1, wherein the electroconductive polymer (A) comprises a unit represented by a formula (1):

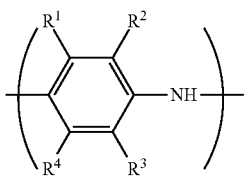

(1)

wherein:
each of $R^1$ to $R^4$ is independently selected from the group consisting of a hydrogen atom, a linear or branched alkyl group having 1 to 24 carbon atoms, a linear or branched alkoxy group having 1 to 24 carbon atoms, an acidic group, a hydroxy group, a nitro group, and a halogen atom;
with the proviso that at least one of $R^1$ to $R^4$ is an acidic group selected from the group consisting of a sulfonic acid group and a carboxylic acid group.

10. An electrical conductor comprising the electroconductive composition according to claim 1.

11. An electrical conductor comprising an electroconductive composition, the electroconductive composition comprising:
an electroconductive polymer (A) comprising a sulfonic acid group and/or a carboxylic acid group, and
a basic compound (B) having two or more nitrogen atoms,
wherein a film thickness of said electrical conductor is 20 to 100 nm, a surface resistance value is $1 \times 10^{10}$ Ω/sq. or less at a temperature of 25° C. and a humidity of 50%, and a change in a surface resistance value is 10 times or less after a week in an environment with a temperature of 25° C. and a humidity of 50%.

12. An electrical conductor comprising an electroconductive composition, the electroconductive composition comprising:
an electroconductive polymer (A) comprising a sulfonic acid group and/or a carboxylic acid group, and
a basic compound (B) having two or more nitrogen atoms,
wherein a film thickness of said electrical conductor is 20 to 100 nm, a surface resistance value is $1 \times 10^{10}$ Ω/sq. or less at a temperature of 25° C. and a humidity of 50%, and a change in a surface resistance value is 10 times or less after immersion for 10 minutes in water at a temperature of 25° C. followed by drying.

13. A laminate comprising the electrical conductor according to claim 10 laminated on at least one surface of a substrate.

14. A method for manufacturing a laminate, comprising:
applying the electroconductive composition according to claim 3 on at least one surface of a substrate, and
heating and drying the applied electroconductive composition to form an electrical conductor.

15. An electroconductive film comprising the electrical conductor according to claim 10.

16. A solid electrolyte condenser comprising a positive electrode comprising a porous body of a valve metal, a dielectric layer formed by oxidation of a surface of the positive electrode, and one or more solid electrolyte layers formed on a surface side of the dielectric layer, in which at least one layer of the solid electrolyte layers comprises the electroconductive composition of claim 1.

17. The solid electrolyte condenser according to claim 16, wherein the electroconductive polymer (A) satisfies the following condition:
a volume average particle diameter of a minimum particle diameter distribution, which includes a peak with the minimum particle diameter among one or more peaks that are obtained by using an electroconductive polymer solution containing the electroconductive polymer (A) at 1% by mass and measuring particle diameter distribution based on dynamic light scattering method, is less than 26 nm.

18. The electroconductive composition according to claim 1, wherein the electroconductive polymer (A) comprises a sulfonic acid group.

19. The electroconductive composition according to claim 1, wherein the electroconductive polymer (A) comprises a carboxylic acid group.

20. The electroconductive composition according to claim 1, wherein the basic compound (B) having two or more nitrogen atoms is a nitrogen-containing heterocyclic compound substituted with a primary, secondary, or tertiary amino group.

* * * * *